(12) United States Patent
Hill et al.

(10) Patent No.: US 7,843,581 B2
(45) Date of Patent: Nov. 30, 2010

(54) CREATING AND SHARING DIGITAL PHOTO ALBUMS

(75) Inventors: Gerard Anthony Hill, Castle Hill (AU); Richard Thomson, Marsfield (AU); David Powlett, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 1100 days.

(21) Appl. No.: 11/101,538

(22) Filed: Apr. 8, 2005

(65) Prior Publication Data

US 2005/0243381 A1  Nov. 3, 2005

(30) Foreign Application Priority Data

Apr. 8, 2004  (AU) .............................. 2004901911

(51) Int. Cl.
*G06F 3/12* (2006.01)
(52) U.S. Cl. ...................... 358/1.15; 358/527; 358/500; 705/26; 705/27; 709/217; 709/227; 709/238; 715/234
(58) Field of Classification Search ....... 358/1.11–1.18, 358/442, 527, 500; 707/10, 100, 200; 709/217
See application file for complete search history.

(56) References Cited

U.S. PATENT DOCUMENTS

| | | | |
|---|---|---|---|
| 6,018,774 A | 1/2000 | Mayle et al. ................. | 709/250 |
| 6,542,936 B1 | 4/2003 | Mayle et al. ................. | 709/250 |
| 6,578,072 B2* | 6/2003 | Watanabe et al. ............ | 709/217 |
| 7,343,320 B1* | 3/2008 | Treyz et al. .................... | 705/26 |
| 2002/0131076 A1* | 9/2002 | Davis .......................... | 358/1.15 |
| 2003/0018667 A1 | 1/2003 | Hoehn et al. ................. | 715/513 |
| 2003/0090528 A1 | 5/2003 | Masuda et al. ............... | 715/838 |
| 2004/0085578 A1* | 5/2004 | Quek et al. .................. | 358/1.18 |
| 2004/0239982 A1* | 12/2004 | Gignac ....................... | 358/1.15 |
| 2005/0052685 A1* | 3/2005 | Herf et al. ................... | 358/1.15 |
| 2006/0203261 A1* | 9/2006 | Kacker ........................ | 358/1.6 |
| 2007/0002362 A1* | 1/2007 | Kacker et al. .............. | 358/1.14 |
| 2007/0103723 A1* | 5/2007 | Wolcott et al. ............. | 358/1.15 |

FOREIGN PATENT DOCUMENTS

| JP | 2002-082957 A | 3/2002 |
|---|---|---|
| JP | 2002-209163 A | 7/2002 |
| JP | 2003-188792 A | 7/2003 |
| JP | 2003-199028 A | 7/2003 |

OTHER PUBLICATIONS

Yahoo! Inc., Flickr (retrieved on Feb. 26, 2004 from URL: http://web.archive.org/web/20040226214842/http://wwvv.flickr.com.

\* cited by examiner

*Primary Examiner*—King Y Poon
*Assistant Examiner*—David S Cammack
(74) *Attorney, Agent, or Firm*—Fitzpatrick, Cella, Harper & Scinto

(57) ABSTRACT

A system (1321) for accessing an image album comprising a plurality of source images over a network (1305) is disclosed. A representation of the image album is stored on a server (1301). The system (1321) comprises means (1304) for downloading, from the server (1301), the representation of the image album. The means (1304) accesses a reduced resolution version of a said one of the plurality of source images dependent upon the representation of the album, and retrieves, from a storage device (eg 1302) located remotely from the server (1301), the source image corresponding to the reduced resolution version.

13 Claims, 23 Drawing Sheets

CREATING AND SHARING DIGITAL PHOTO ALBUMS

FIELD OF THE INVENTION

The present invention relates to a method of creating and sharing an image album.

BACKGROUND

Currently, creation and sharing of new image collections is cumbersome and time consuming. One current approach to creating a new image collection entails copying and pasting desired images from various historic image repositories directly into a new document. This limits the ability of the collection creator to easily and conveniently create a desired image order and arrangement in the new document. Furthermore, sharing the new collection typically is performed by emailing the new collection to selected recipients. This can cost the collection creator significant time and consume significant network resources, and does not enable the collection creator to easily and conveniently keep track of what has been sent to whom.

SUMMARY

It is an object of the present invention to substantially overcome, or at least ameliorate, one or more disadvantages of existing arrangements.

Disclosed are arrangements which seek to address the above problems.

A number of terms are used throughout this description. An "album" (alternately referred to as an image album) refers to the collection of source images, arranged in a desired format, which is created and shared. The album typically comprises two components, one being an "album file" (also referred to as the representation of the album) and the other being the collection of source images. The collection of source images can, in some cases, be directly incorporated into the album file, in which case the album is the album file. In most cases however, particularly when the images are large, the album comprises the aforementioned two components. The terms "album" and "album file" are, in some cases, used interchangeably, and the particular meaning intended to be ascribed to the terms can be ascertained from the context. The album file, in the typical case, comprises references to the source images in the image collection, format information defining how the album is laid out and presented, and resolution information about the images.

Typically, the source images are high resolution images. In this case, the disclosed arrangements provide album recipients with a responsive technique for viewing the album, by enabling reduced resolution versions of the high resolution source images to be accessed directly from a server. The high resolution source images can be accessed, from the server or from another machine, if the high resolution images are of interest. If the source images are moderate or low resolution images, then the aforementioned approach is not necessary, and the album recipient can access the source images directly.

In regard to creation of a new album, a visually displayed intermediate assembly scratch pad (also referred to as a "tray") is provided. The tray comprises a convenient mechanism for performing an initial assembly of source images, prior to compiling the assembled images into the new album. The tray also enables an initial assembly of selected source images to be re-arranged, prior to the album compilation.

In regard to sharing of the album, a representative but smaller version of the album is uploaded to a central server, from where it is accessible by selected recipients. The recipients are notified by email that the album is available. Such an email typically includes two hyperlinks for accessing the server. One link facilitates a "viewing only" mode, this being useful for recipients who wish only to view the album. Another link facilitates both viewing, and also manipulation and copying of the album, perhaps in order for the recipient to create a further new album using the first album as an image repository.

According to a first aspect of the present invention, there is provided a method of accessing, over a network, an image album comprising a plurality of source images, wherein a representation of the image album is stored on a server, the method comprising the steps of:

downloading, from the server, the representation of the image album;

accessing a reduced resolution version of a said one of the plurality of source images dependent upon the representation of the album; and retrieving, from a storage device located remotely from the server, the source image corresponding to the reduced resolution version.

According to another aspect of the present invention, there is provided an apparatus for accessing, over a network, an image album comprising a plurality of source images, wherein a representation of the image album is stored on a server, the apparatus comprising:

means for downloading, from the server, the representation of the image album;

means for accessing a reduced resolution version of a said one of the plurality of source images dependent upon the representation of the album; and means for retrieving, from a storage device located remotely from the server, the source image corresponding to the reduced resolution version.

According to another aspect of the present invention, there is provided a computer program product having a computer readable medium having a computer program recorded therein for directing a processor to effect a method of accessing, over a network, an image album comprising a plurality of source images, wherein a representation of the image album is stored on a server, the program comprising:

code for downloading, from the server, the representation of the image album;

code for accessing a reduced resolution version of a said one of the plurality of source images dependent upon the representation of the album; and code for retrieving, from a storage device located remotely from the server, the source image corresponding to the reduced resolution version.

Other aspects of the invention are also disclosed.

BRIEF DESCRIPTION OF THE DRAWINGS

One or more embodiments of the present invention will now be described with reference to the drawings and appendices, in which.

Figure 1:
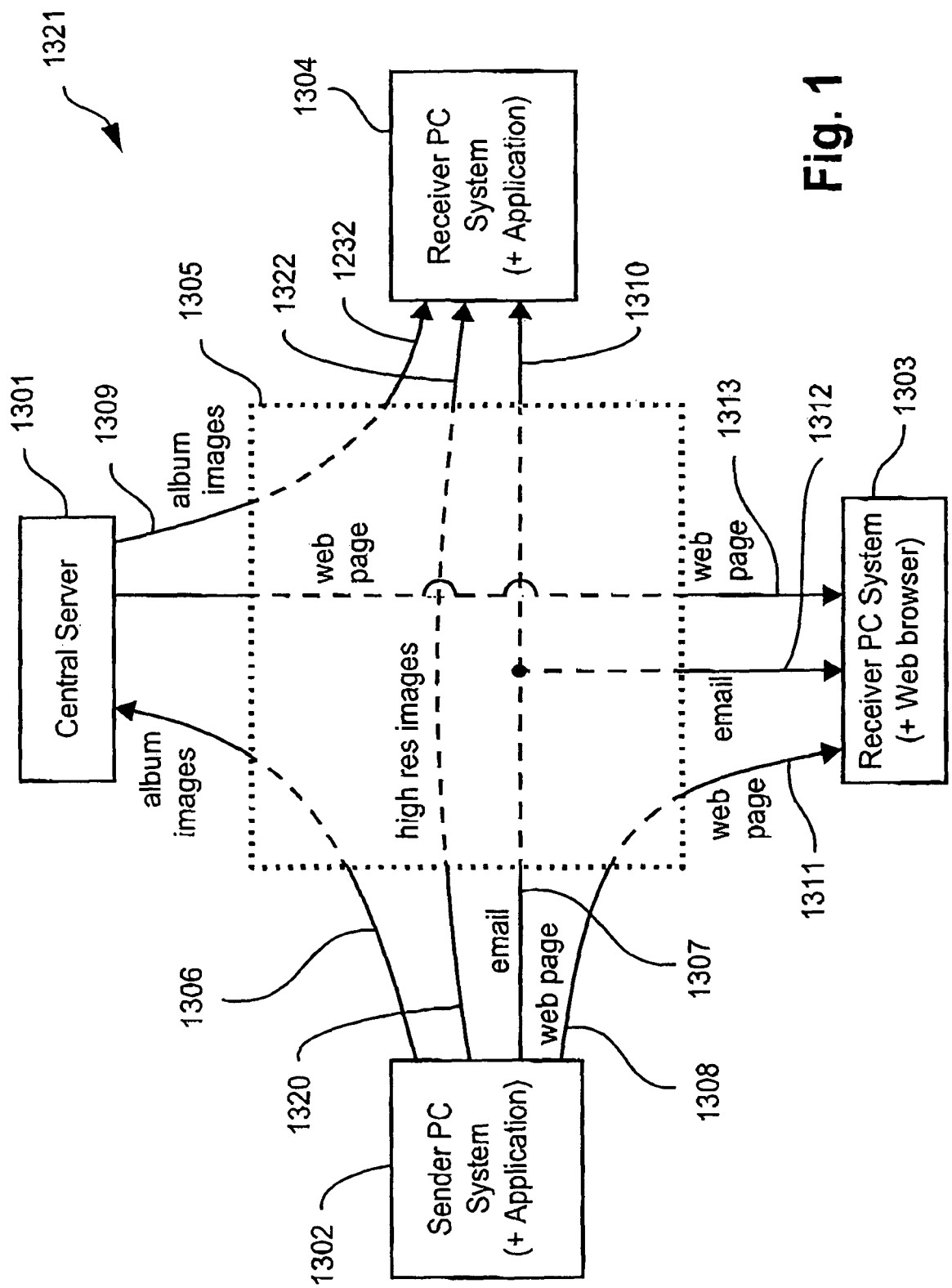
FIG. 1 shows a system functional block diagram for a preferred arrangement of the album creation and sharing system.

Appendix A is a spread sheet representation of the GUI transition operations and attributes.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

From a terminology perspective, in this description, the "album creator" creates the new "album" which can be shared by one or more "album recipients". A recipient can elect to "merely view" the album, or alternately, can "view and manipulate" the album. The term "manipulate" includes copying images, and even creating a further album using the first album as an image repository. In the GUIs shown in FIGS. 13-22, GUI controls and GUI areas are generally described in capital type.

FIG. 1 shows a system functional block diagram of a preferred arrangement 1321 of the disclosed album creation and sharing system. The system 1300 comprises a sender personal computer (PC) system 1302 used by the album creator, receiver PC systems 1303 and 1304 used by recipients who can share an album that has been created by the album creator, and a central server machine 1301 upon which the created album, and/or representations thereof, are stored. The sender PC 1302, the recipient PCs 1303 and 1304 and the server 1301 are interconnected by a communications network 1305. A suite of requisite software applications, which implement the disclosed album creation and sharing method, run on the sender PC 1302, the receiver PCs 1303 and 1304, and the server 1301.

An album creator uses the software application running on the sender PC 1302 to create a desired album from previously stored images. These previously stored images can be retrieved from hard disk(s), or from previously created albums which the user has either created by him or her-self, or has received from other sources. Having created the new album, the creator sends representations of the created album to the server 1301 over the connection 1306. These representations can include images at low and/or medium resolution. The creator can then notify selected recipients, such as the users of the receiver PCs 1303 and 1304, that the aforementioned album is available. This the album creator does by sending emails, over the connections 1307, 1312 and 1310, to the receiver PCs 1303 and 1304.

The recipients can then, using their respective PCs 1303 and 1304, access the created album and/or the representations thereof that have been stored on the server 1301. If the recipient using the receiver PC 1303, which is running a web browser application 1292 (see FIG. 2) wishes to merely view the created album, this can be done by using the web browser application 1292 (which is part of a third party part 1204 in FIG. 2) that is running on the PC 1303 to view the album. The album or representations thereof is sent from the server 1301 on a connection 1313 and/or from the sender PC 1302 on the connection 1308/1311 in web page format using HTML, CSS, JPG, GIF and Javascript, for example (see 1308 in FIG. 2).

Figure 2:
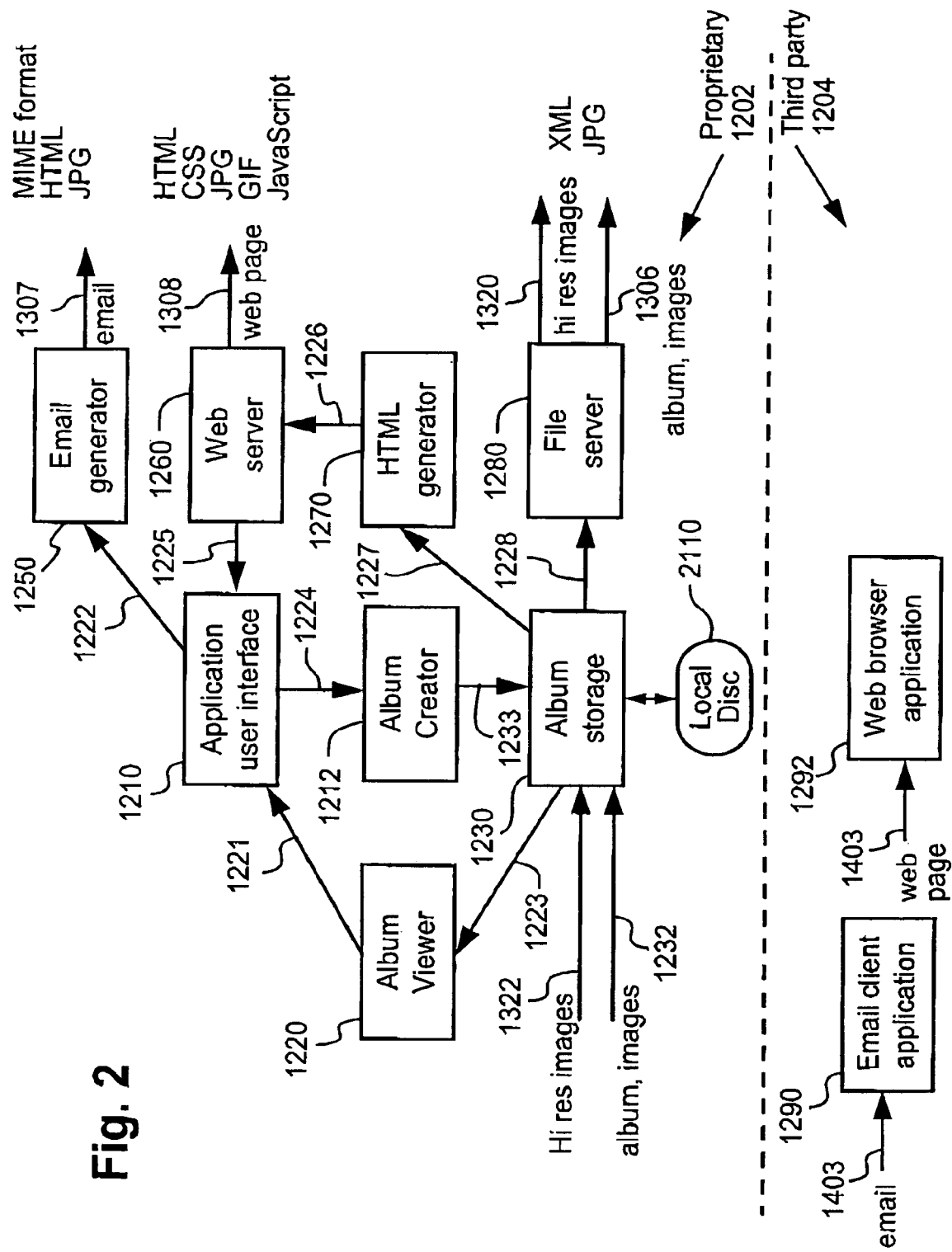
FIG. 2 shows a functional block diagram for a local subsystem used by an album creator and an album recipient.

Alternately, if the recipient using the PC 1304, which is running the creator application 1202 (see FIG. 2) wishes to both view, and possibly also to manipulate or copy the album in order, for example, to create his or her own album, then this can be done if the user has the requisite album creation/sharing software application 1202 running on the receiver PC 1304 (see the proprietary part 1202 in FIG. 2). This application 1202 is used to view and operate upon the album or representations thereof, which is sent from the server 1301 on the connection 1313 in XML, JPG format.

As described above, the server 1301 is capable of providing the album either in a form suitable for mere viewing by the web browser 1292 running on the receiver PC 1303, or in a form suitable for viewing and manipulation to the receiver PC 1304 that has the creation application proprietary part 1202 (see FIG. 2) running on the PC 1304.

From a process perspective, after the album has been created, the sender PC 1302 sends the created album, and/or representations thereof consisting of album data and referenced image files which may include images at low and medium resolution, on the connection 1306 to the server 1301 for storage. The sender PC 1302 sends notification emails on the connections 1307, 1312 and 1310 to the respective receiver PC systems 1303 and 1304.

The sender PC 1302 can also send web pages representing album pages or views of the album on request from the web browser 1292 running on receiver PC 1303 to the receiver PC 1303 via the connections 1308 and 1311. The server 1301 can also send the album and/or representations thereof in web page format to the receiver PC 1303 via a connection 1313 for mere viewing if the PC 1303 is running only the third party part 1204 (see FIG. 2). The server 1301 sends the album and images at low or medium resolution in XML and JPEG format respectively to the receiver PC system 1304 via the connection 1309 for viewing and manipulation if the PC 1304 is running the proprietary part 1202 (see FIG. 2).

High resolution images may be requested by the receiver 1304 from the sender 1302. These high resolution images are delivered by the sender PC 1302 via connections 1320 and 1322 from the file server module 1280 that is running on the sender PC 1302. Accordingly, the disclosed system 1300 can operate with the central server 1301 serving the sender PC 1302 and the receiver PCs 1303 and 1304, or alternately, the sender PC 1302 can act as a server in a peer-to-peer arrangement in regard to the receiver PCs 1303 and 1304.

If a user of one of the receiver PCs 1303, 1304 requests a high resolution image from the server 1301, the central server typically redirects the request to the sender PC 1302, or another peer machine (not shown) where the desired high resolution image is stored. In one example, the initial request is sent from the receiver PC 1303 to the server 1301. The server 1301 then re-directs the request to the sender PC 1302. The sender PC 1302 then fulfils the request using the web server module 1260 that is running on the sender PC 1302. If the sender PC 1302 is off line and there are no other peers on line that can fulfil the request, then the server notifies the receiver PC 1303 of this fact. The receiver PC 1303 can, optionally, request delayed delivery of the high resolution image, which will then be sent by the sender PC 1302 or another peer when that machine comes on line. Alternately, the server 1301 fulfils the request from the receiver PC 1303 to the extent possible, by providing only the low and medium resolution images if the high resolution image is not available.

Accordingly, the receiver PC 1303 can request the album from the central server 1301 if the album has been stored on the server 1301 by the sender PC 1302. Alternately, or in addition, an initial request from the receiver PC 1303 to the central server 1301 can be redirected from the central server 1301 to the sender PC 1302. In such a case, the sender PC 1302 can send the album which has been stored locally on the local disk 2110 directly to the receiver PC 1303 via the connection 1308.

FIG. 2 shows a functional block diagram for a PC 1200 that can be used by the album creator and/or an album recipient dependent upon the sub-system elements that are included. The PC 1200 is partitioned into the proprietary part 1202, and a third party part 1204. The third party part 1204 comprises the email client application 1290 and the web browser application 1292. These two third party applications respectively are sufficient for performing the notification function indicating that a shared album is available, and for supporting mere viewing of the created album. Accordingly, if the PC 1200 is provisioned only with the third party part 1204, then the PC is not suitable for album manipulation and/or creation, but is suitable for mere album viewing.

The proprietary part 1202 has an album creation software application comprising a viewer 1220 that is connected by a connection 1221 to an application user interface 1210. The application user interface 1210 communicates by a connection 1222 to an email generator 1250. The application user interface 1210 also communicates via a connection 1224 with an album creator module 1212. The album creator module 1212 communicates via a connection 1233 with an album storage module 1230. The album storage module 1230 receives albums and/or images from a remote PC via a connection 1232, and communicates via a connection 1223 with the album viewer 1220. The email generator 1250 sends emails using the connection 1307 (see FIG. 1), where these emails can be in MIME format, contain HTML, and can include images in JPG format and so on.

A web server 1260 communicates with the application user interface 1210 via a connection 1225. The web server 1260 also sends web pages via the connection 1308 (see FIG. 1), where these web pages can consist of HTML, CSS, JPG, GIF or Javascript format as well as other similar formats. The album storage module 1230 communicates by a connection 1227 with an HTML generator 1270, which in turn communicates by a connection 1226 with the web server 1260. The album storage module 1230 also communicates by a connection 1228 with a file server 1280, which communicates albums and/or images on the connection 1306 (see FIG. 1), where these albums and images can be in XML, and/or JPG or similar formats, and high resolution images on the connection 1320 (see FIG. 1) where these images can be in JPG or similar formats.

From a functional perspective, the system 1200 receives albums and images on the connection 1232 and 1322 from external image repositories. The system 1200 stores this information using the album storage module 1230 in a local hard drive module 2110 (see FIG. 3). The aforementioned stored albums and images can be viewed by the album viewer 1220 via the connection 1223 and can be manipulated using the application user interface 1210 which communicates with the album viewer 1220 via the connection 1221. The application user interface 1210 provides selected images via the connection 1224 to the album creator module 1212 which outputs a created album via the connection 1233 to the album storage module 1230. This module 1230 then stores the created album in the local disk module 2110.

The album storage module 1230 can retrieve the created album from the local disk module 2110 and can provide the created album via the connection 1228 to the file server 1280 which then sends the albums consisting of album data and image data via the connection 1306 to the central server 1301 (see FIG. 1). High-resolution images may be transferred to the receiver PC 1304 by using connection 1320. The album storage module 1230 can also send the created album via the connection 1227 to the HTML generator 1270 which communicates the created album in the form of web pages to the web server 1260 via the connection 1226. The web server 1260 in turn sends the created album in HTML, CSS, JPG, GIF and/or JavaScript format via the connection 1308 to the receiver PC 1303 in FIG. 1 typically by using the Hypertext Transfer protocol HTTP.

The album storage module 1230 can retrieve the created album from the local disk module 2110 and communicate the retrieved album via the connection 1228 to the file server 1280, which in turn sends the created album via the connection 1306 to the central server 1301 (see FIG. 1). The web server 1260 provides the content for the album display on the user interface 1210 over the connection 1225.

Accordingly, the application user interface 1210 presents information consisting of the album display, user activated menus, toolbar buttons, system status, etc. on a screen 2114 (see FIG. 3) for the user. The display for albums is created by the album viewer 1220 in combination with the web server 1260 and the display is fed to the user interface 1210 by the connection 1221 and 1225 respectively. Information for preparing the album display for the album viewer 1220 is supplied over a connection 1223 by the album storage nodule 1230 which interfaces to the local disc drive 2110.

The album creator module 1212 is responsible for both managing the creation of the albumS, and for saving the albumS using the album storage module 1230. The album creator module 1212 receives instructions from the application user interface 1210, which is exemplified by the graphical user interfaces (GUIs) shown in FIGS. 13-20, via the connection 1224.

The web server 1260 provides, via the connection 1225, a display of the album to the user interface 1210 and also provides a web page display, via the connection 1308, for external use, typically by transmission via the communications network 1305. The content of this web page can include, but is not limited to, HTML, CSS, JPG, GIF and Javascript documents.

The HTML generator 1270 provides, via the connection 1226, the visual content to the web server 1260 and obtains data, via the connection 1227, from the album storage 1230. The email generator 1250 creates the email content and distributes, via the connection 1307, the content to the recipient PCs 1304 and 1303, typically over the communications network 1305. This content distribution is controlled via the user interface 1210. The email that is sent via the connection 1307 can include, but is not limited to, HTML and JPG documents, and the email is formatted in MIME format (Multipurpose Internet Mail Extensions).

The file server 1280 serves, via the connection 1306 and 1320, the content that is requested by other systems. This requested content includes created albums and images that can include, but are not limited to, XML and JPG documents including high-resolution images. The file server 1280 obtains, via the connection 1228, data from the album storage module. The album storage module 1230 also receives, via the connection 1232, albums and images from remote systems. The album storage module 1230 also receives via the connection 1322 high resolution images from remote systems.

The third party part 1204 comprises the software applications 1290 and 1292 that do not participate directly in the disclosed creation and sharing technique. However, these software applications are used for ancillary functions relating to created albums that are available for sharing, namely the "view only" function and the "email notification" function. Accordingly, the third party part 1204 includes the email client application 1290 that is used for receiving and displaying the email notifications, and the web browser application 1292 that is used for mere viewing of the albums.

Figure 21:
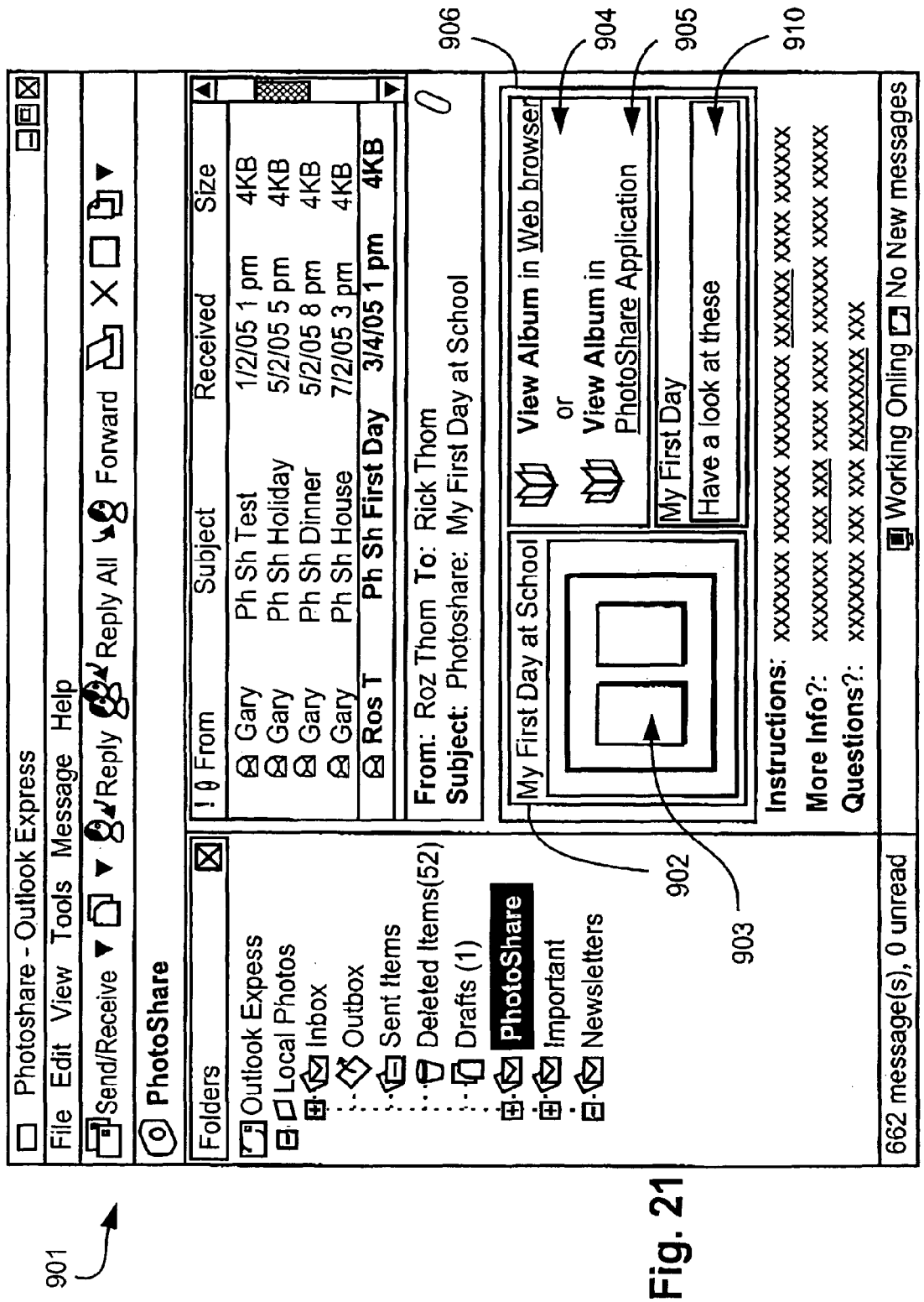
FIG. 21 shows a recipient GUI for email notification that the shared album is now available.

In one arrangement, the web browser 1292 is launched from the email application 1290 in order to merely view a received album by selection of a link 904 (FIG. 21). The email shown by the email application 1290 having the appearance 901 (FIG. 21) is the email that is sent by the email generator 1250 and is in MIME format. The email is typically sent over the communications network 1305. The web page displayed on the web browser 1292, via the connection 1308 (see FIG. 1), is served by the web server 1260. The web page is typically served over the communications network 1305.

Figure 3:
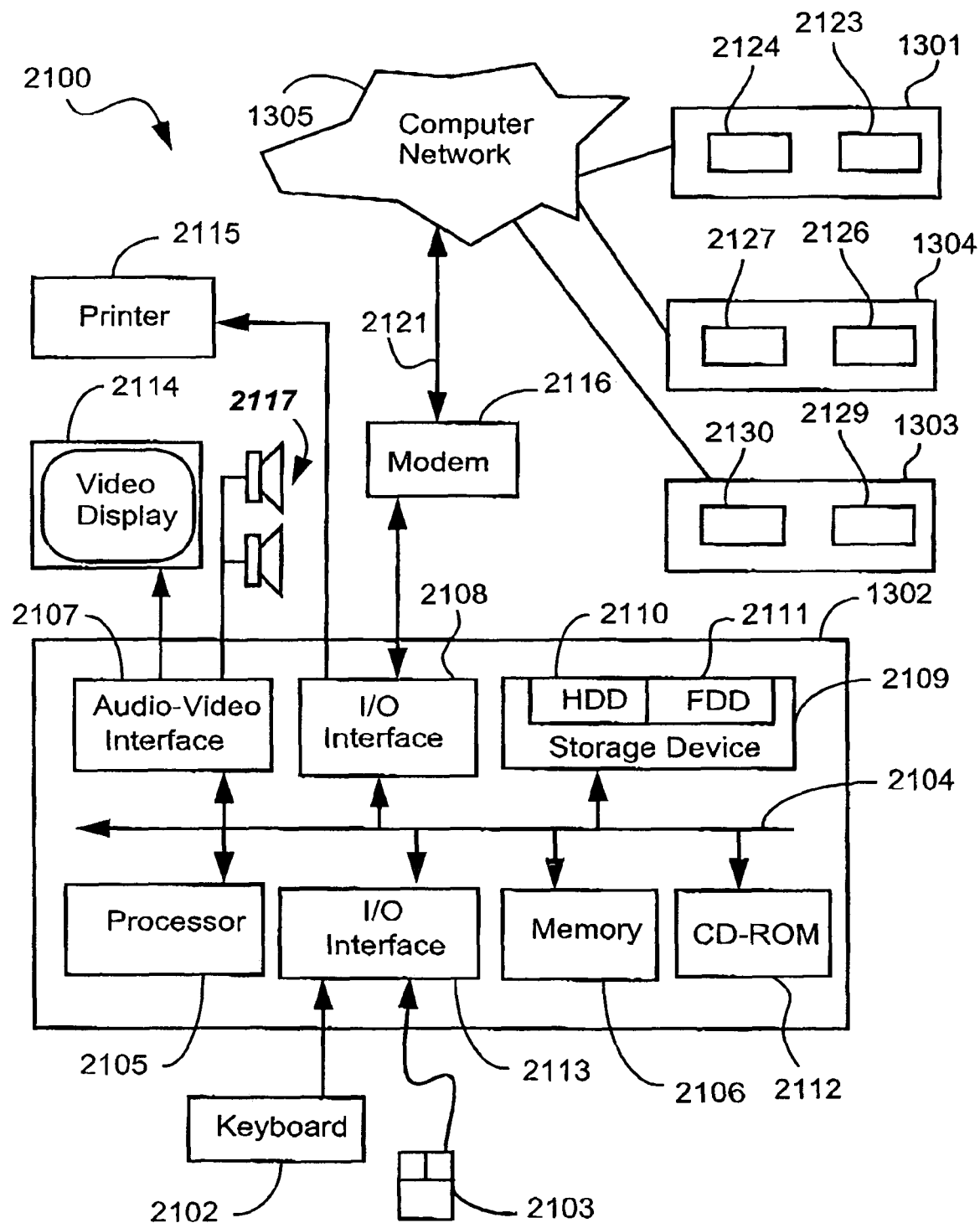
FIG. 3 is a schematic block diagram of a general purpose computer system upon which arrangements described can be practiced.

FIG. 3 is a schematic block diagram of a general purpose computer system 2100 upon which arrangements described can be practiced. The preferred arrangement of the album creation and sharing method uses a set of associated computer applications hosted, for example, via the Microsoft Windows operating system on a number of interconnected computer systems 1301-1304 (see FIG. 1). The application programs have user interfaces which include menu items and controls which respond to mouse and keyboard operations. The applications can transmit data to one or more printers such as 2115 that are either directly connected to the computers or accessed over the network 1305. The applications also have the ability to communicate data to entities connected to the network 1305.

The method of creating and sharing image albums is thus preferably practiced using a general-purpose computer system 2100, such as that shown in FIG. 3 wherein the processes of FIGS. 4, and 6-12 may be implemented as software, such as application program modules executing within the computer system 2100. The computer system 2100 comprises the sender PC 1302 (see FIG. 1), the recipient PCs 1304, 1303, and the central server 1301. In particular, the steps of method of creating and sharing an image album are effected by instructions in the software modules that are carried out by the computers.

The instructions may be formed as one or more sets of code modules, each for performing one or more particular tasks. The software modules may also be divided into separate parts, some parts performing the album creation and sharing methods, and other parts managing user interfaces between the software application parts and the album creator and/or album recipients. The software may be stored in computer readable media, including the storage devices described below, for example. The software is loaded into the computers from the computer readable media, and then executed by the computers. A computer readable medium having such software or computer program recorded on it is a computer program product. The use of the computer program products in the computers preferably effects an advantageous system for creating and sharing image albums.

The description relating to the computer system 2100 is directed primarily to the album creator PC 1302 which is described in some detail. The computers 1301, 1303 and 1304 are shown in reduced form in FIG. 3 each comprising only a respective processor and memory, and these computers are not described in detail. However, it is apparent that the description of the computer 1302 is applicable to the other computers 1301, 1304 and 1303. The computer 1302 comprises input devices such as a keyboard 2102 and mouse 2103, output devices including the printer 2115, a display device 2114 and loudspeakers 2117. A Modulator-Demodulator (Modem) transceiver device 2116 is used by the computer module 1302 for communicating to and from the communications network 1305, for example connectable via a telephone line 2121 or other functional medium. The modem 2116 can be used to obtain access to the Internet, and other network systems, such as the computers 1301, 1304 and 1302 as well as a Local Area Network (LAN) or a Wide Area Network (WAN), and may be incorporated into the computer module 1302 in some implementations.

The computer module 1302 typically includes at least one processor unit 2105, and a memory unit 2106, for example formed from semiconductor random access memory (RAM) and read only memory (ROM). Similarly, the computer modules 1301, 1304 and 1303 respectively comprise processor units 2124, 2127 and 2130, and memory units 2123, 2126 and 2129. The module 1302 also includes a number of input/output (I/O) interfaces including an audio-video interface 2107 that couples to the video display 2114 and loudspeakers 2117, an I/O interface 2113 for the keyboard 2102 and mouse 2103 and optionally a joystick (not illustrated), and an interface 2108 for the modem 2116 and printer 2115. In some implementations, the modem 2116 may be incorporated within the computer module 1302, for example within the interface 2108.

The storage device 2109 is provided and typically includes a hard disk drive 2110 and a floppy disk drive 2111. A magnetic tape drive (not illustrated) may also be used. A CD-ROM drive 2112 is typically provided as a non-volatile source of data. The components 2105 to 2113 of the computer module 1302, typically communicate via an interconnected bus 2104 and in a manner which results in a conventional mode of operation of the computer system 2100 known to those in the relevant art. Examples of computers on which the described arrangements can be practised include IBM-PC's and compatibles, Sun Sparcstations or alike computer systems evolved therefrom.

Typically, application programs relating to the album creator functions are resident on the hard disk drive 2110 and read and controlled in their execution by the processor 2105. Intermediate storage of the programs and any data fetched from the network 1305 may be accomplished using the semiconductor memory 2106, possibly in concert with the hard disk drive 2110. In some instances, the application programs may be supplied to the user encoded on a CD-ROM or floppy disk and read via the corresponding drive 2112 or 2111, or alternatively may be read by the user from the network 1305 via the modem device 2116. Still further, the software can also be loaded into the computer system 2100 from other computer readable media.

The term "computer readable medium" as used herein refers to any storage or transmission medium that participates in providing instructions and/or data to the computer system 2100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1302. Examples of transmission media include radio or infra-red transmission channels as well as a network connection to another computer or networked device, and the Internet or Intranets including e-mail transmissions and information recorded on Websites and the like.

Figure 4:
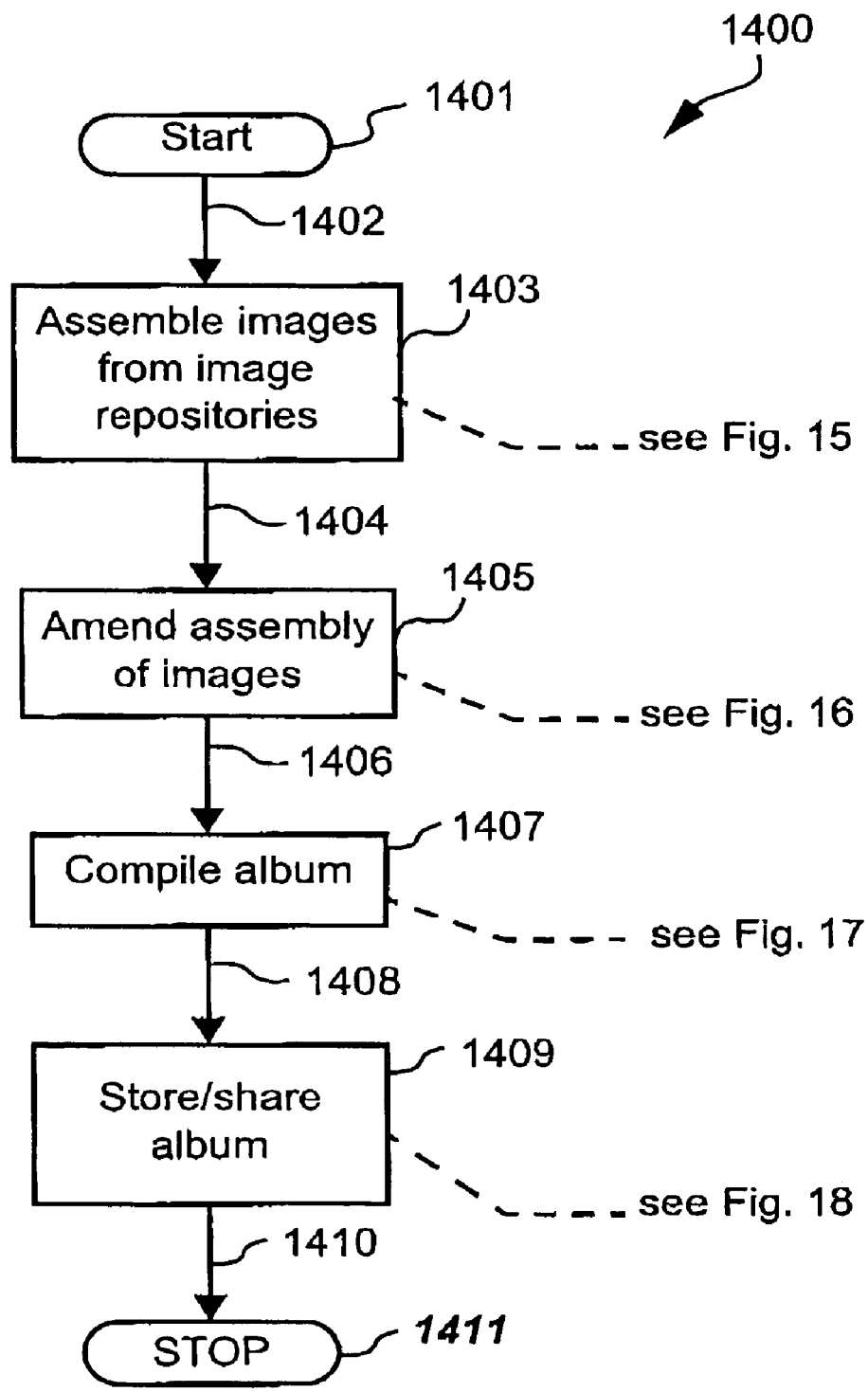
FIG. 4 is a process flow chart of method steps for creating and sharing an album.

FIG. 4 shows a process flow chart of method steps for creating and sharing an is album. The process 1400 commences with a start step 1401 after which a step 1403 (see FIG. 6 for more details) assembles images from image repositories which can comprise previously created albums, images stored on hard disk and so on. Thereafter, a step 1405 (see FIG. 7 for more details) amends the assembly of images. A following step 1407 (see FIG. 8 for more details) compiles the new album, after which a step 1409 (see FIG. 10 for more details) stores and/or shares the aforementioned created album. Finally, the process 1400 terminates with a stop step 1411.

Figure 5:
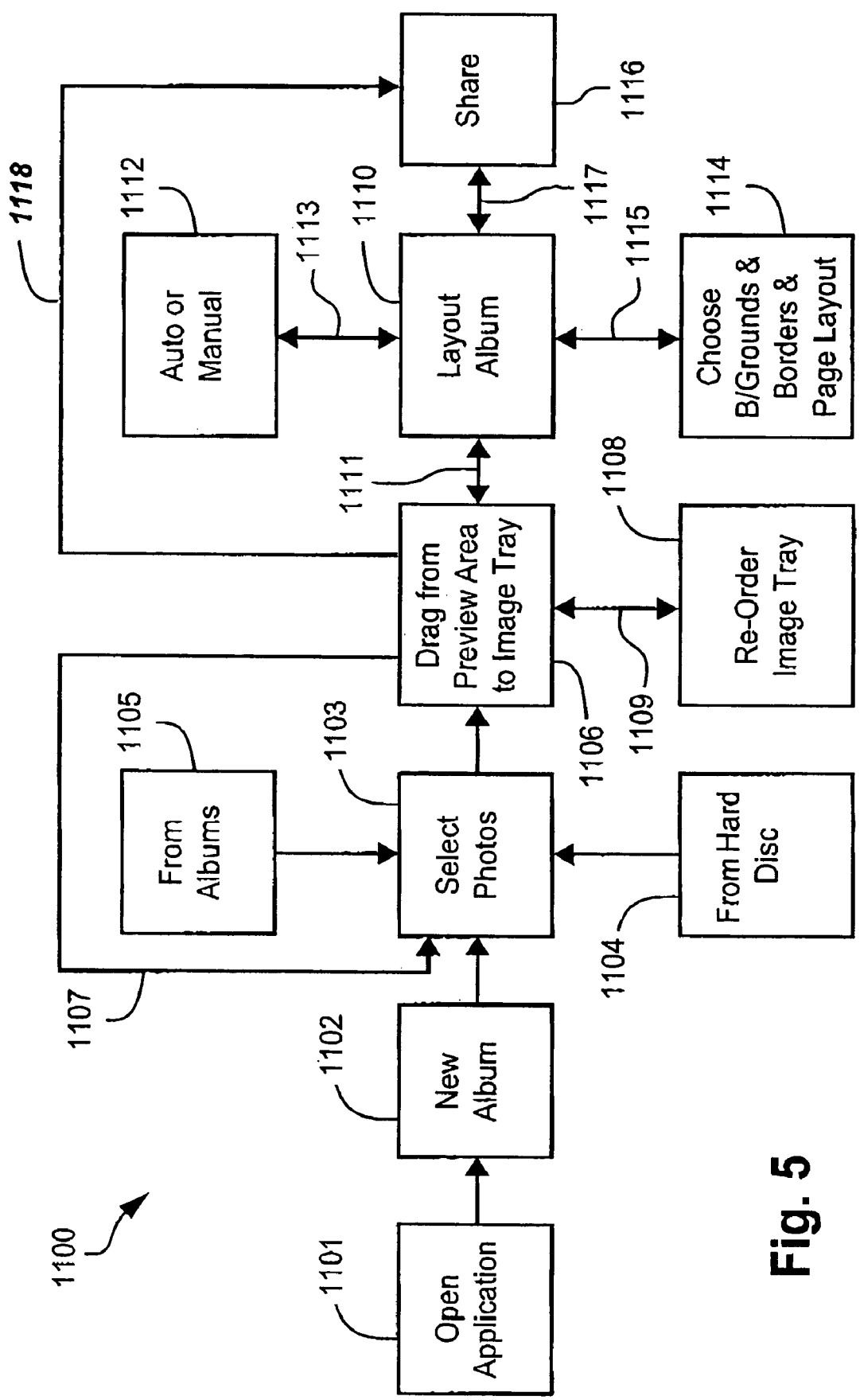
FIG. 5 shows a work-flow diagram for creating and sharing an album.

FIG. 5 shows a work-flow associated with creating and sharing the new album. The work-flow 1100 commences with a step 1101 in which the album creator opens the album creation/sharing application on the sender PC 1302 (see FIG. 1). Thereafter, in a step 1102 the album creator creates a new album. In general the new album that is created in the step 1102 will not contain any images or ancillary information such as album style or theme. In a following step 1103, the user selects images from one or both of a hard disk module 1104 and other albums 1105. As will be described later in regard to the various GUIs comprising the application user interface 1210 (see FIG. 2) the images in the hard disk module 1104 and the stored albums 1105 are presented to the user in a preview area such as 470 (see FIG. 16) or 544 (see FIG. 17).

Thereafter, in a step 1106 the user drags desired images from the aforementioned preview area to an image tray. The image tray 480 (see FIG. 16) or 580 (see FIG. 17) enables the user to re-order the images, that have been initially assembled in the step 1106, in a step 1108. An arrow 1107 between the steps 1106 and 1103 depicts the fact that the user can iteratively select, and re-select, image repositories from the available hard disks 1104 and the stored albums 1105.

Once the album creator has completed selection of desired images from the hard disks 1104 and the albums 1105, and having completed assembly and amendment of the assembly of the images in the image tray in the step 1108, the album creator is then able, in a step 1110 to lay out the album. The album creator can elect either automatic or manual compilation, as depicted by a step 1112 and a bilateral arrow 1113. The album creator first, however, selects backgrounds, and borders and page layout for the album in a step 1114. Having laid out the album, the album creator then proceeds to a step 1116 in which the album creator shares the album by sending it to the central server 1301 and sending emails to the recipients. As depicted by an arrow 1118 the user is also able to directly share the images in the image tray with desired recipients as they are automatically added to the new album before sharing.

Figure 6:
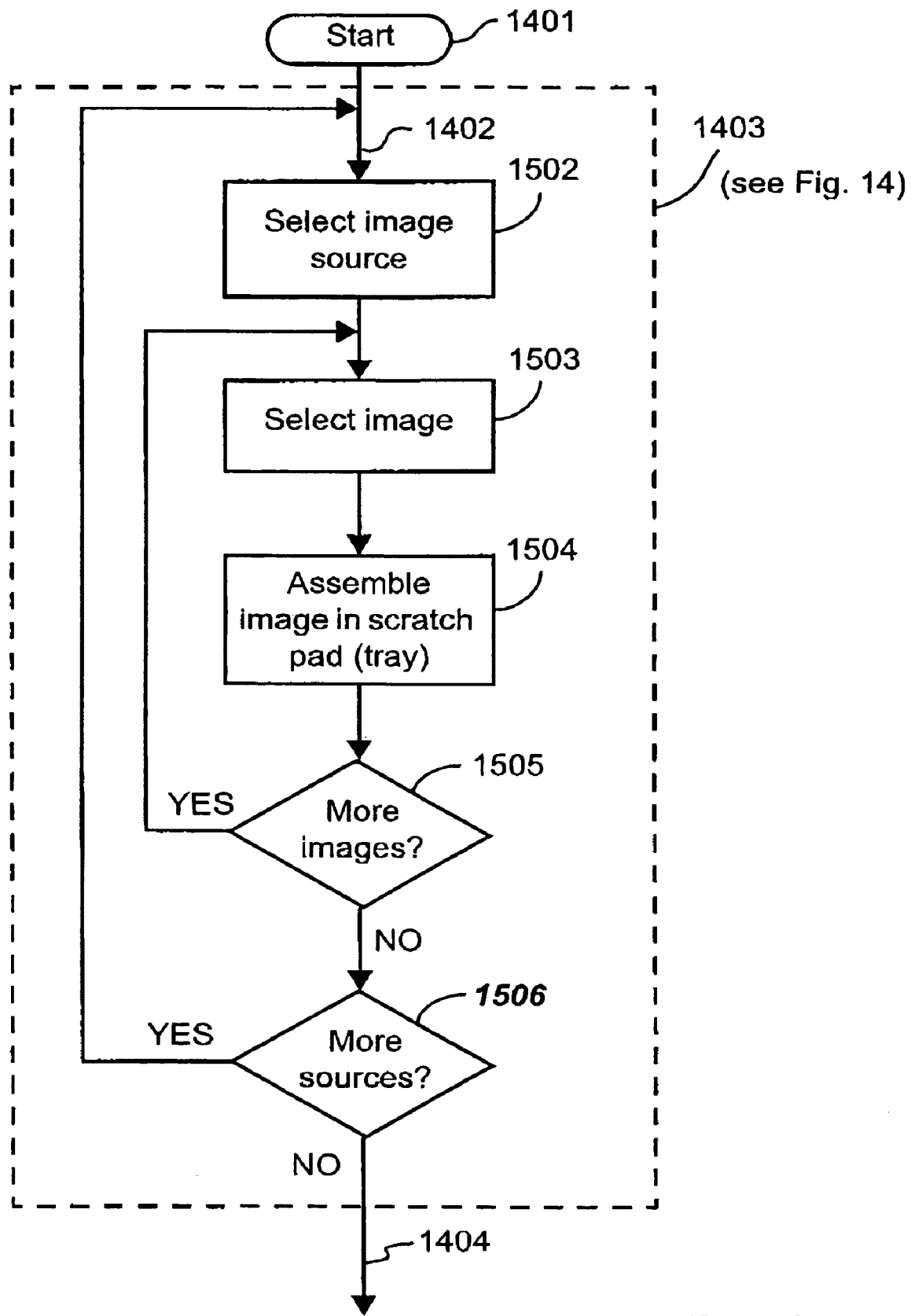
FIG. 6 is a process flow chart showing the image assembly step of FIG. 4 in more detail.

FIG. 6 is a process flow chart showing the image assembly step 1403 of FIG. 4 in more detail. The process 1403 commences with a step 1502 which selects a source of images from available image repositories (such as the albums 1105 and the hard disks 1104 in FIG. 5). Thereafter, a step 1503 selects a particular image from the selected source, after which a step 1504 assembles the aforementioned image in the visually displayed scratch pad that is referred to in the present description as a tray. This act of assembly is characterised by the fact that a selected image is not only placed in the tray, but is placed in a particular position which can, however, be changed.

Thereafter, a decision step 1505 determines whether more images are desired from the presently selected source. If this is the case, then the process 1403 is directed by a YES arrow back to the step 1503. If, on the other hand, no further images are desired from the presently selected source, then the process 1403 is directed by a NO arrow to a decision step 1506. The step 1506 determines whether further image sources are required for the present album from the various image repositories that are available. If this is the case, then the process 1403 is directed by a YES arrow back to the step 1502. If, however, no further image sources are required, then the process 1403 is directed by a NO arrow 1404 to the step 1405 (see FIG. 4).

Figure 7:
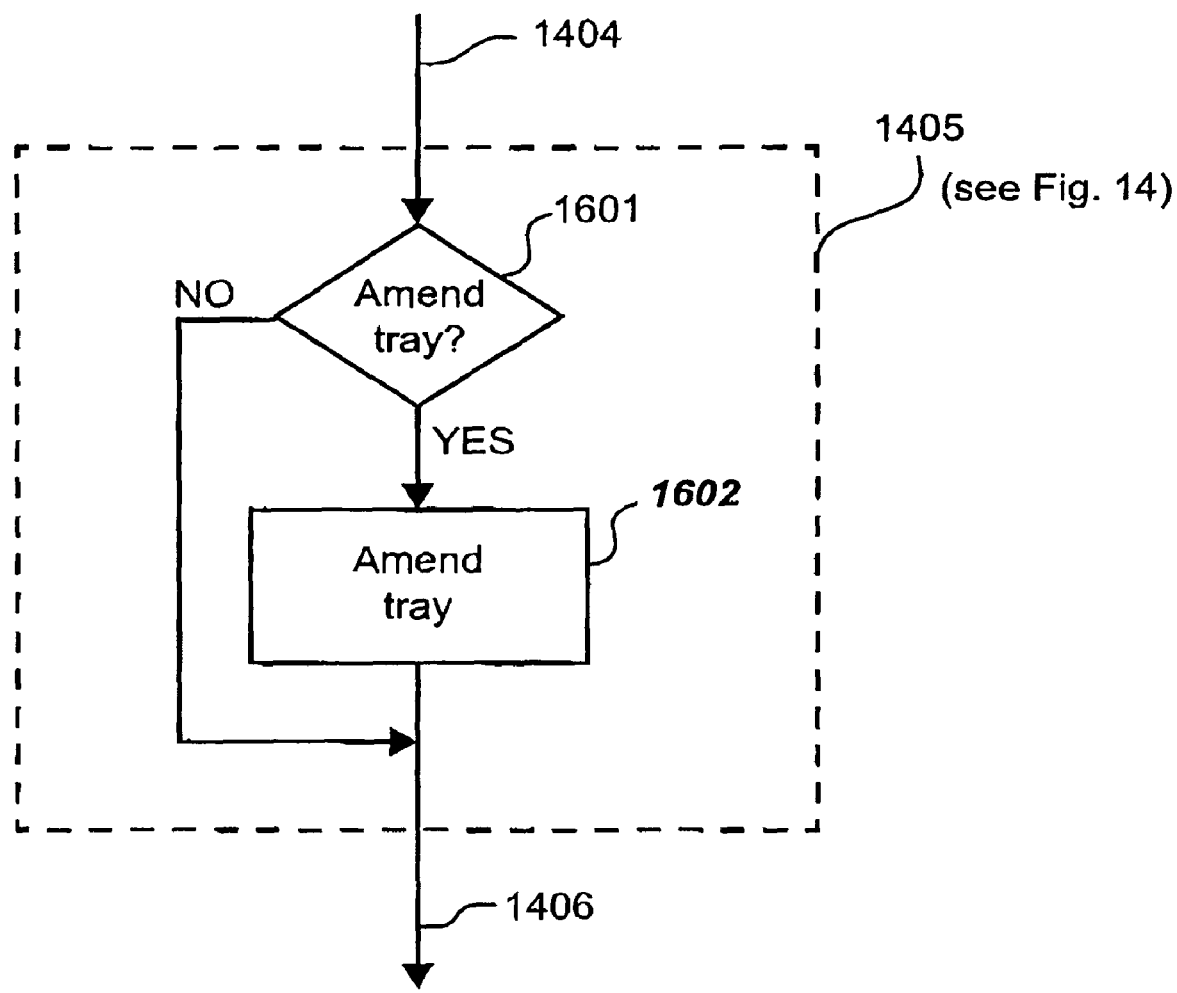
FIG. 7 is a process flow chart showing the amend assembly step of FIG. 4 in more detail.

FIG. 7 is a process flow chart showing the amend assembly step 1405 of FIG. 4 in more detail. The process 1405 commences with a decision step 1601 which determines whether it is desired to amend the contents of the tray. This amending step refers to the fact that the relative locations and relative order of images that have been assembled in the tray in the step 1403 (see FIG. 4) can be amended thereby changing the image assembly. If it is desired to amend the tray, then the process 1405 is directed by a YES arrow to a step 1602. The step 1602 amends the tray by shifting images in the tray relative to each other, and/or deleting images from the tray. Thereafter, the process 1405 is directed by an arrow 1406 to the step 1407 (see FIG. 4). Returning to the decision step 1601, if it is not desired to amend the tray, then the process 1405 is directed by a NO arrow to the step 1407.

Figure 8:
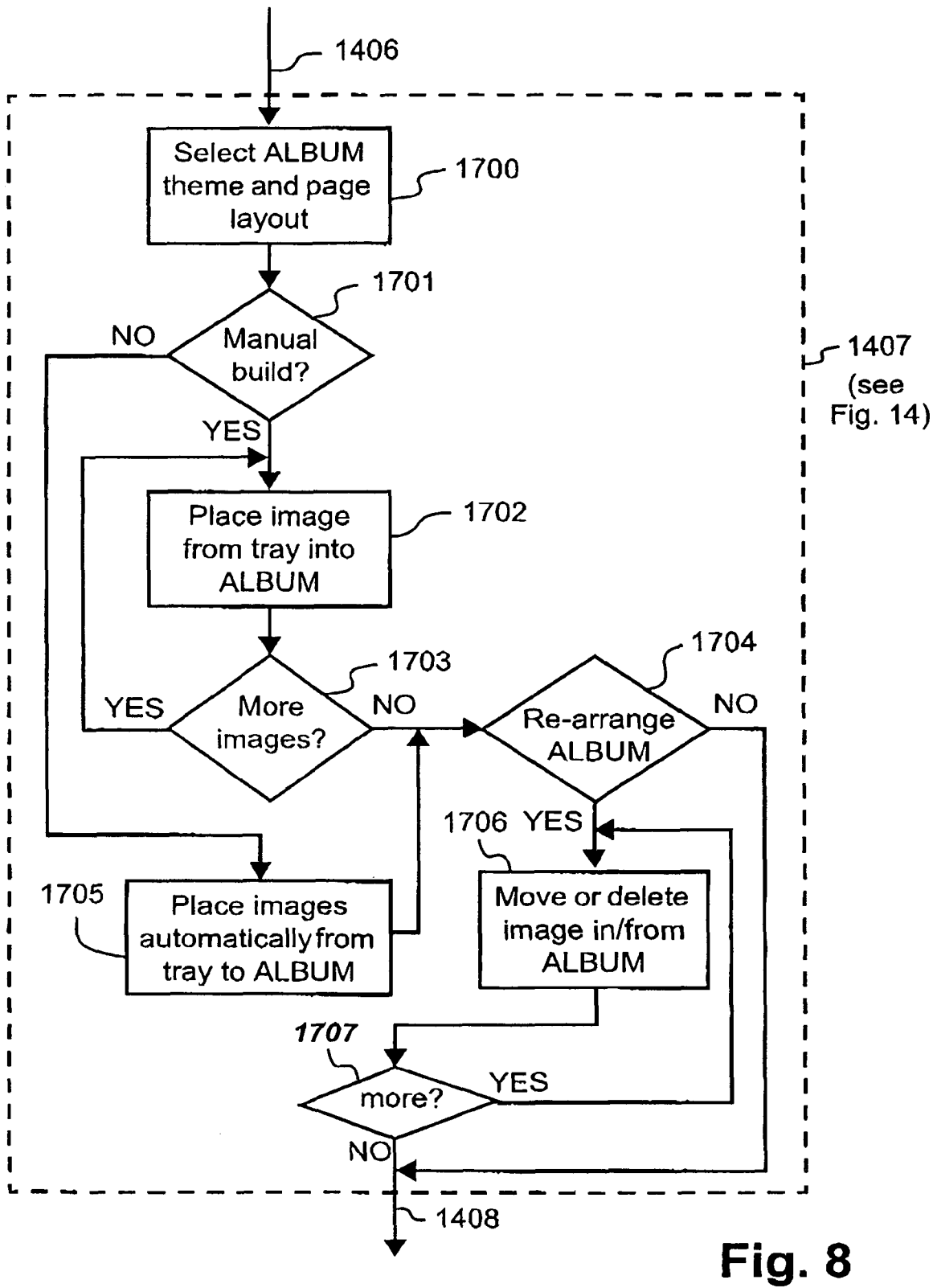
FIG. 8 is a process flow chart showing the compile album step of FIG. 4 in more detail.

FIG. 8 is a process flow chart showing the compile album step 1407 of FIG. 4 in more detail. The process 1407 commences with a step 1700 that selects a theme and page layout for the created album. The terms "theme" and "page layout" relate, respectively, to choice of background and border for the album and number of images per page and the layout positioning of the images on the page. Accordingly, the step 1700 produces the background, borders, and additional non-image material that serve to personalise and customise the album. Thereafter, a decision step 1701 determines whether a manual process is desired for building the album from the images in the tray. If this is the case, then the process 1407 is directed by a YES arrow to a step 1702. The step 1702 places a particular image from the tray into the album. The step 1702 enables a desired image to be taken from a selected position in the tray and placed into a selected position on a chosen page of the album.

Thereafter, a step 1703 determines whether further images are to be placed in the album from the tray. If this is the case, then the process 1407 is directed by a YES arrow back to the step 1702. If, on the other hand, no further images from the tray are to be selected, or alternately, if the tray is now empty, then the process 1407 is directed by a NO arrow to a step 1704.

The step 1704 determines whether it is desired to re-arrange the album that has now been manually compiled. If this is the case, then the process 1407 is directed by a YES arrow to a step 1706. The step 1706 enables images in the album to be moved, relative to each other, and/or deleted from the album. Thereafter, the process 1407 is directed to a decision step 1707. The step 1707 determines whether further re-arrangement of the album is desired. If this is the case, then the process 1407 is directed by a YES arrow back to the step 1706. If, on the other hand, no further album re-arrangement is desired, then the process 1407 is directed by a NO arrow to the step 1409 (see FIG. 4). Returning to the decision step 1704, if it is not desired to re-arrange the album, then the process 1407 is directed by a NO arrow to the step 1409 (see FIG. 4).

Returning to the manual build step 1701, if the manual option is not selected, then the process 1407 is directed by a NO arrow to a step 1705. The step 1705 takes the images that have been assembled in the tray, and places these images automatically in the album. This automatic placement can be based on different automatic placement approaches Thus, for example, images can be taken sequentially from the tray and placed sequentially in the album. This approach takes images sequentially from the tray, which in a preferred arrangement is a linear array of images, and places the images from left to right and top to bottom on sequential pages of the album. Other automatic placement approaches can also be used. This could include arranging images chronologically by date/time of capture, alphabetically by file name or in a random fashion. Thereafter, the process 1407 is directed to the step 1704 relating to possible re-arrangement of the album.

Figure 9:
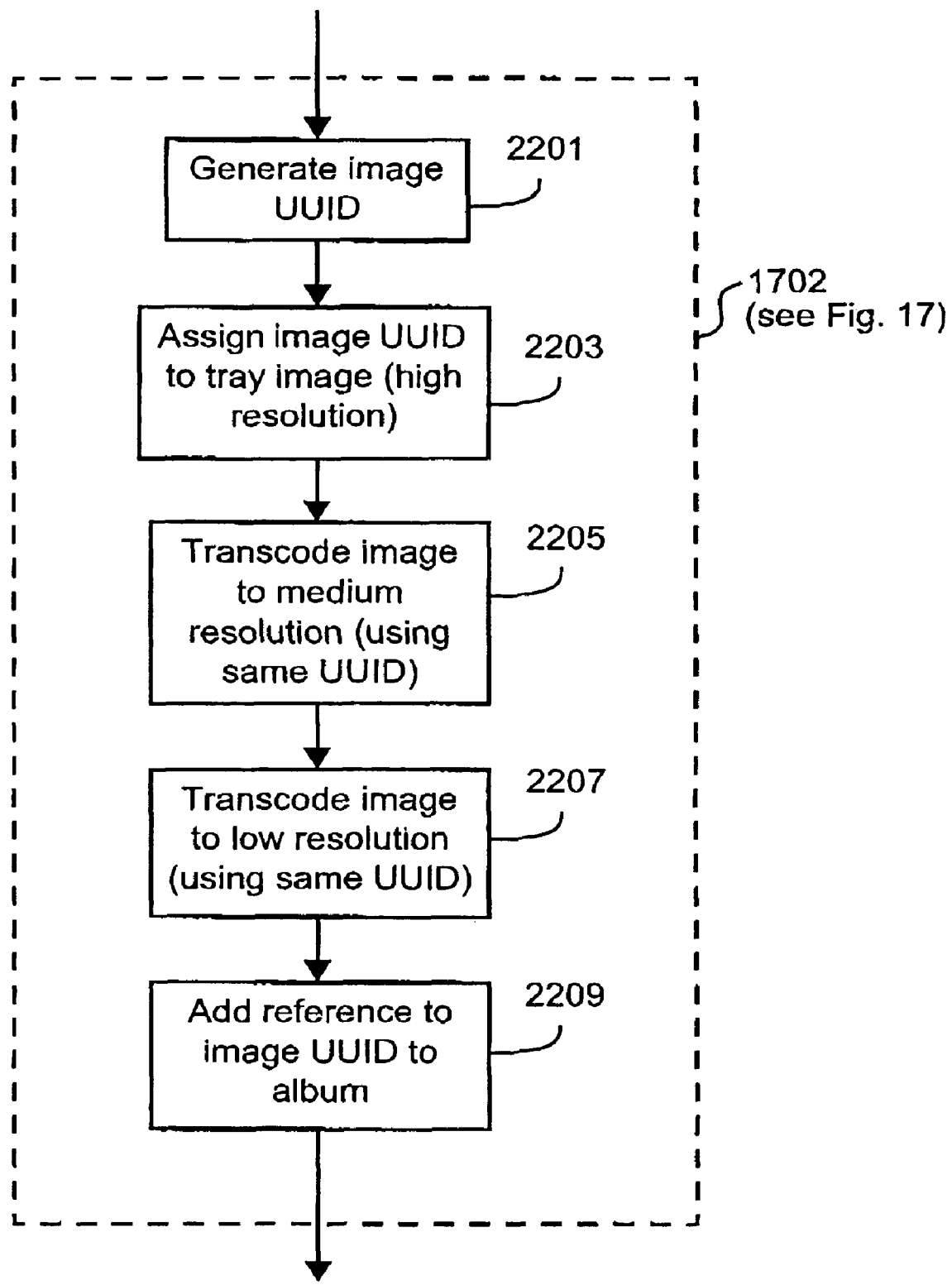
FIG. 9 is a process flow chart showing the "place image from tray into album" step of FIG. 8 in more detail.

FIG. 9 is a process flow chart showing the image placement from tray into album step 1702 of FIG. 8 in more detail. The process 1702 commences at a step 2201 where the Universally Unique Identifier (UUID) is generated for the image in the tray that is being added to the album. The UUID can be created by mathematically combining a plurality of values into one long bit string of fixed length resulting in a unique number. Typically this is a 128-bit value composed using a fixed algorithm from the Media Access Control (MAC) address of the generating computer and the time it is generated. The MAC address is itself a unique identifier associated with networking equipment that may be present in the computer such as Network Interface Cards (NIC).

In a following step 2203 of FIG. 9 the UUID generated in step 2201 is assigned to the image that is being added to the album from the tray, this being the high-resolution original source image. In a following step 2205, the high-resolution image is transcoded to one of medium resolution which is also assigned the UUID from step 2201. Typically, the medium-resolution image has a maximum resolution of 640 pixels horizontally and vertically.

At a following step 2207, the high-resolution image is transcoded to one of low resolution which is also assigned the UUID from step 2201. Typically, the low-resolution image has a maximum resolution of 80 pixels horizontally and vertically. At a following step 2209, the UUID reference to the image is added to the album. Said single UUID reference allows retrieval of the low, medium and high resolution images. In the preferred arrangement, the filename used for each of the images is composed of the UUID being assigned to the image concatenated with the resolution of the image, said resolution indicated in the form of a two character short form of the resolution. Another addressing technique could be employed, such as embedding the UUID and image resolution in the metadata of the images. Furthermore, unique addresses could be assigned to each of the high, moderate and low resolution images.

Figure 10:
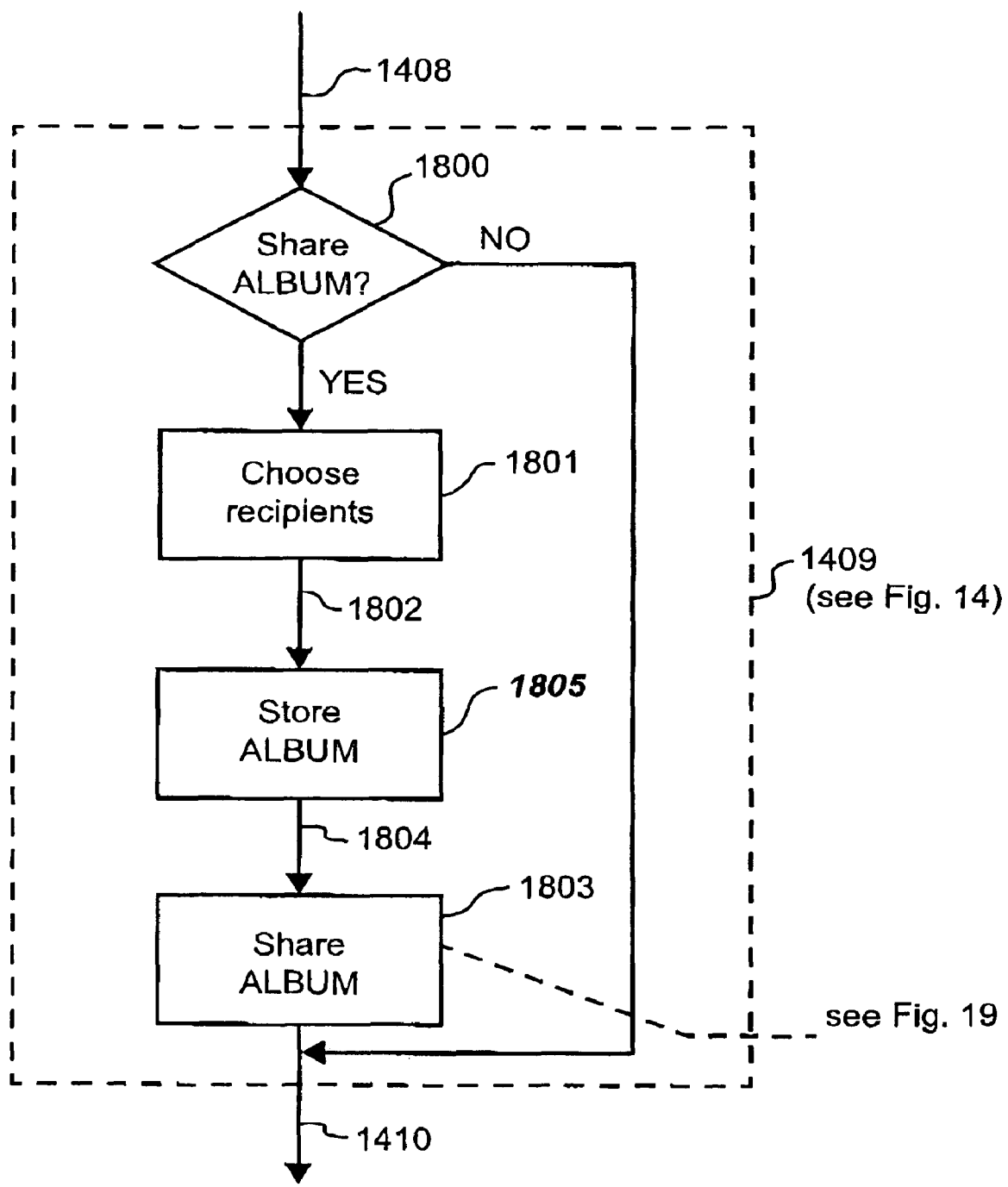
FIG. 10 is a process flow chart showing the store/share album step of FIG. 4 in more detail.

FIG. 10 is a process flow chart showing the store/share album step 1409 of FIG. 4 in more detail. The process 1409 commences with a decision step 1800 which determines whether the album is to be shared or not. If the album is to be shared, then the process 1409 is directed by a YES arrow to a step 1801. The step 1801 chooses recipients with whom the album is to be shared. This choosing step involves choosing the intended recipients of the album by means of an address book containing user identity code, image, email address and name.

In the preferred arrangement, the identity code of each of the recipients is stored in the album. This code may be an identifier assigned by the server thereby having global scope or a locally generated encoding of the recipients email address. The user may also choose access control for the album, including whether the album is to be considered public or private. A following step 1805 stores the album on the local storage system 2110 (see FIG. 2). Thereafter, a step 1803, that is performed by the album creator PC 1302, shares the album by both storing the album on the central server 1301 and notifying the selected recipients as will be described in regard to FIG. 11. Although the steps, 1803 and 1805 are shown in a particular order in FIG. 10, clearly this order can be changed without affecting the process 1409. After the album has been stored in the step 1805, the process 1409 is directed by the arrow 1410 to the STOP step 1411 (see FIG. 4).

Figure 11:
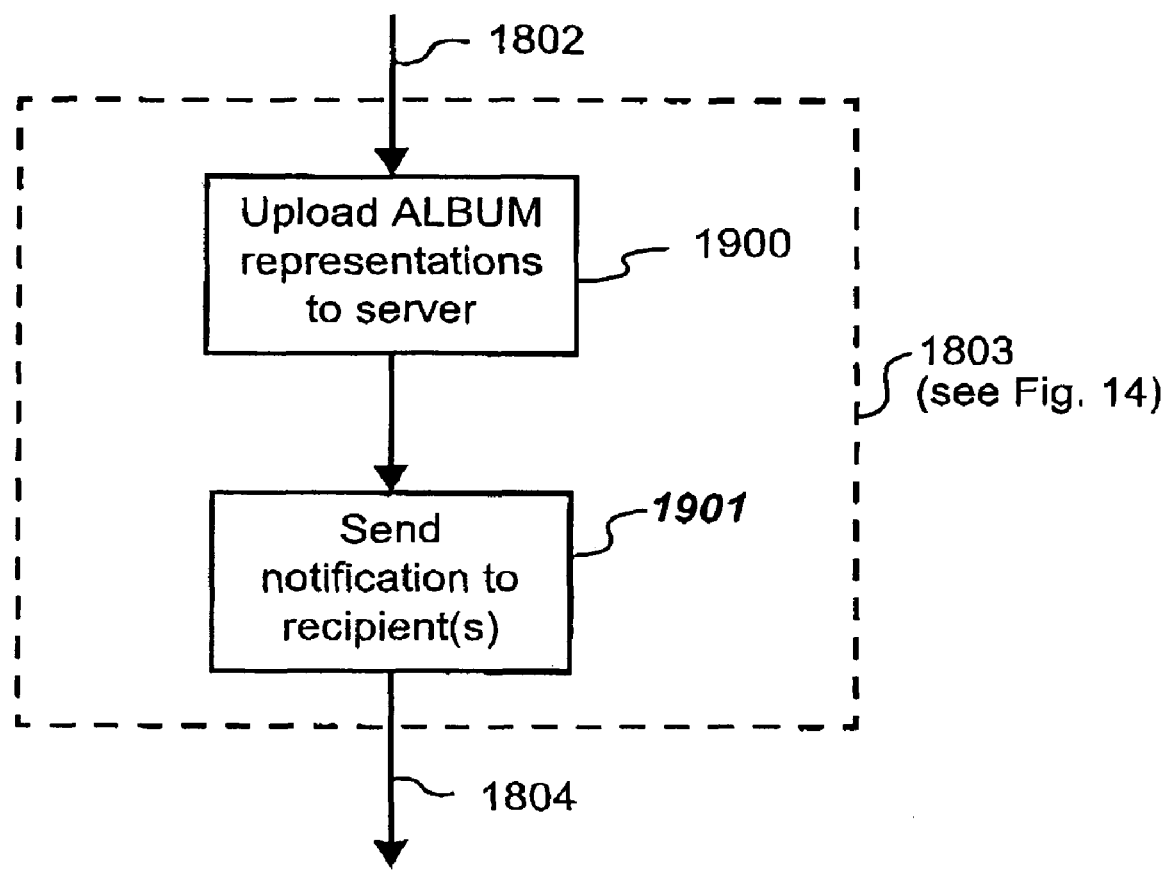
FIG. 11 is a process flow chart showing the share album step of FIG. 10 in more detail.

FIG. 11 is a process flow chart showing the share album step 1803 of FIG. 10 in more detail. The process 1803 commences with a step 1900 which uploads representations of the album to the central server 1301 (see FIG. 1). The low and medium resolution images for each of the images in the album have previously been created at step 1702 (see FIG. 22) during creation of the album. The low and medium resolution images are uploaded to the server along with the other album data contained in the image file. High resolution images may be uploaded at a future time upon request. It is the responsibility of the central server 1301 (see FIG. 13) to store the album and the low and medium resolution images and serve them upon request. In the preferred arrangement the server also stores all locations of the machines storing high-resolution images. This allows the server to redirect a request for a high-resolution image to another machine.

Thereafter, a step 1901 sends a notification email to the selected recipients. The email contains at least one unique reference which can be in the form of a hyperlink allowing a recipient of the album to retrieve the album from the central server. The email may also include an image providing a representation of the album that has bas been created and shared. The process 1803 is then directed by the arrow 1804 to the step 1805 (sec FIG. 10).

Figure 12:
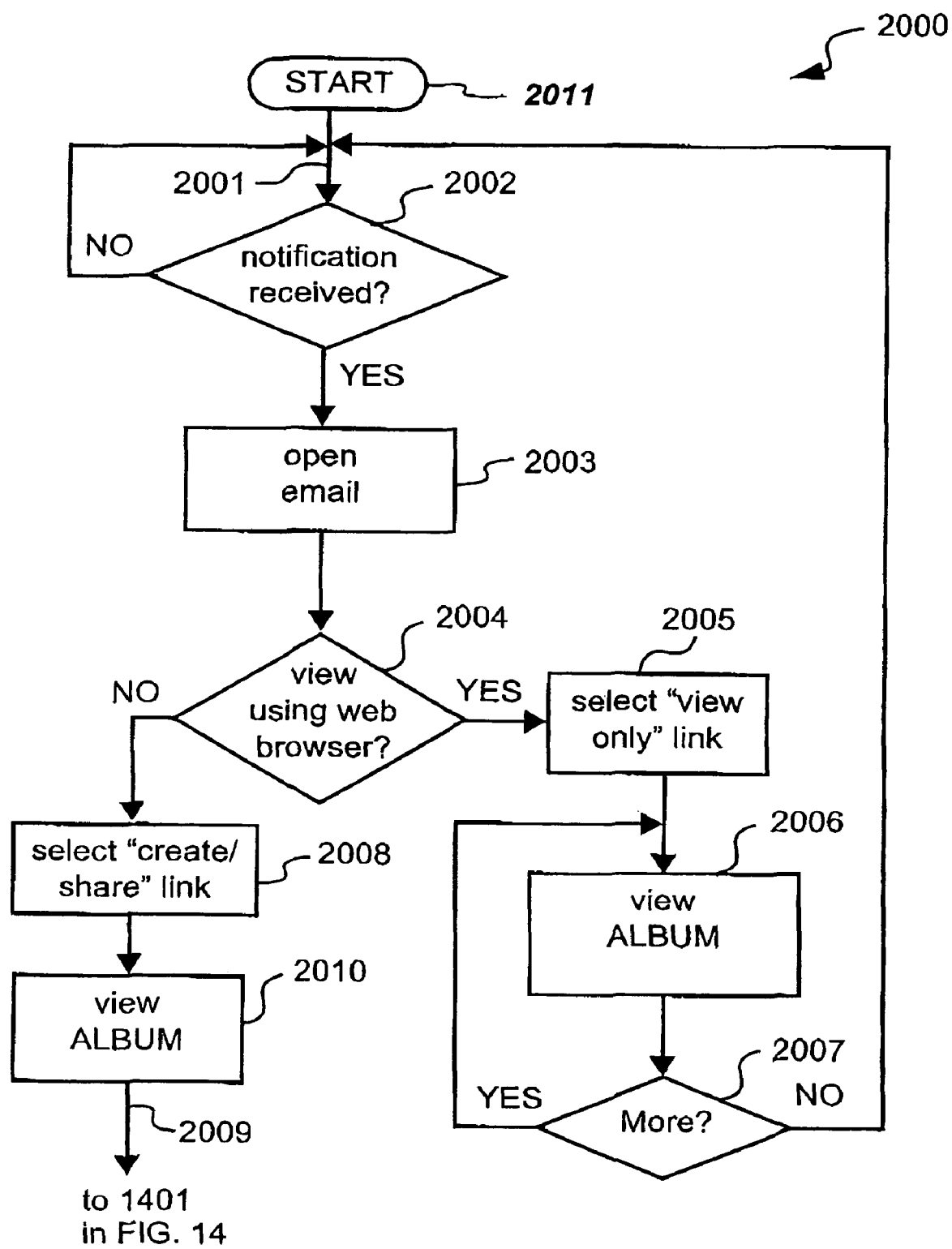
FIG. 12 is a process flow chart of method steps for viewing an album by an album recipient.

FIG. 12 is a process flow chart of method steps for viewing, by an elected recipient, a shared album. The process 2000 commences with a decision step 2002 that determines whether a notification email has been received (see 1310 in FIG. 1). If this is not the case, then the process 2000 is directed by a NO arrow back to the step 2002. If, however, a notification is received, then the process 2000 is directed by a YES arrow to a step 2003.

The step 2003 opens the email which provides notification that the album is now available for sharing. The received email, according to one arrangement, contains two web-hyperlinks, providing the recipient of the email with two corresponding options for accessing the album. A subsequent step 2004 determines whether the "view only" option is desired. If this is the case, then the process 2000 is directed by a YES arrow to a step 2005. The step 2005 involves selecting the "view only" link in the received email such as 904 (see FIG. 21), after which a step 2006 views the album using the web browser application 1292 (see FIG. 2). The hyperlink selected at the step 2005 contains a unique identifier for the album. This identifier is included as part of a link to the central server allowing the central server to serve the requested album. The step 2006 enables the user to both view the images that are downloaded from the server, and to request that higher resolution images be downloaded. The higher resolution images are requested by using the same image UUID as used to access the low and medium resolution images, however the request specifies to the server that the high resolution version is required. The server may in such a case redirect the request to a peer that is known to be storing the image.

In the preferred arrangement the user is required to log in to view an album that is marked as "private". No such login is required if the album was marked as "public" by the sender. A following decision step 2007 determines whether further viewing is required. If this is the case, then the process 2000 is directed by a YES arrow back to the step 2006. If no further viewing is required, then the process 2000 is directed by a NO arrow back to the step 2002.

Returning to the step 2004, if the recipient wishes to both view the album, and also possibly wishes to manipulate or use the album, and if the recipient has on his or her PC 1304 the software applications in the proprietary part 1202, then the process 2000 is directed by a NO arrow to a step 2008 that selects the "create/share" hyperlink that is provided in the email such as 905 (see FIG. 21). The process is then directed to a step 2010 that views the album using the creation application 1202 (see FIG. 2). The hyperlink selected at the step 2008 contains a unique identifier for the album. This identifier is received as part of the link to the central server, allowing the central server to serve the requested album. The step 2010 enables the user to both view the images that are downloaded from the server, and to request that higher resolution images be downloaded.

In the described arrangements, the higher resolution images are requested by using the same image UUID as for the display of low and medium resolution images and specifying to the server that the high resolution version is required. The server may in such a case redirect the request to a peer that is known to be storing the image. Thereafter, the process 2000 is directed by an arrow 2009 to the step 1401 in FIG. 4. This option enables the recipient of the album to manipulate the received album thereby creating a new album which draws material from the received album which now constitutes an image repository.

It should be noted, having regard to FIG. 1, that once a created album is uploaded to the central server 1301, that particular album can no longer be modified as the local album and the central server album must match. Instead, new albums can be created using the aforementioned album as an image repository.

Figure 13:
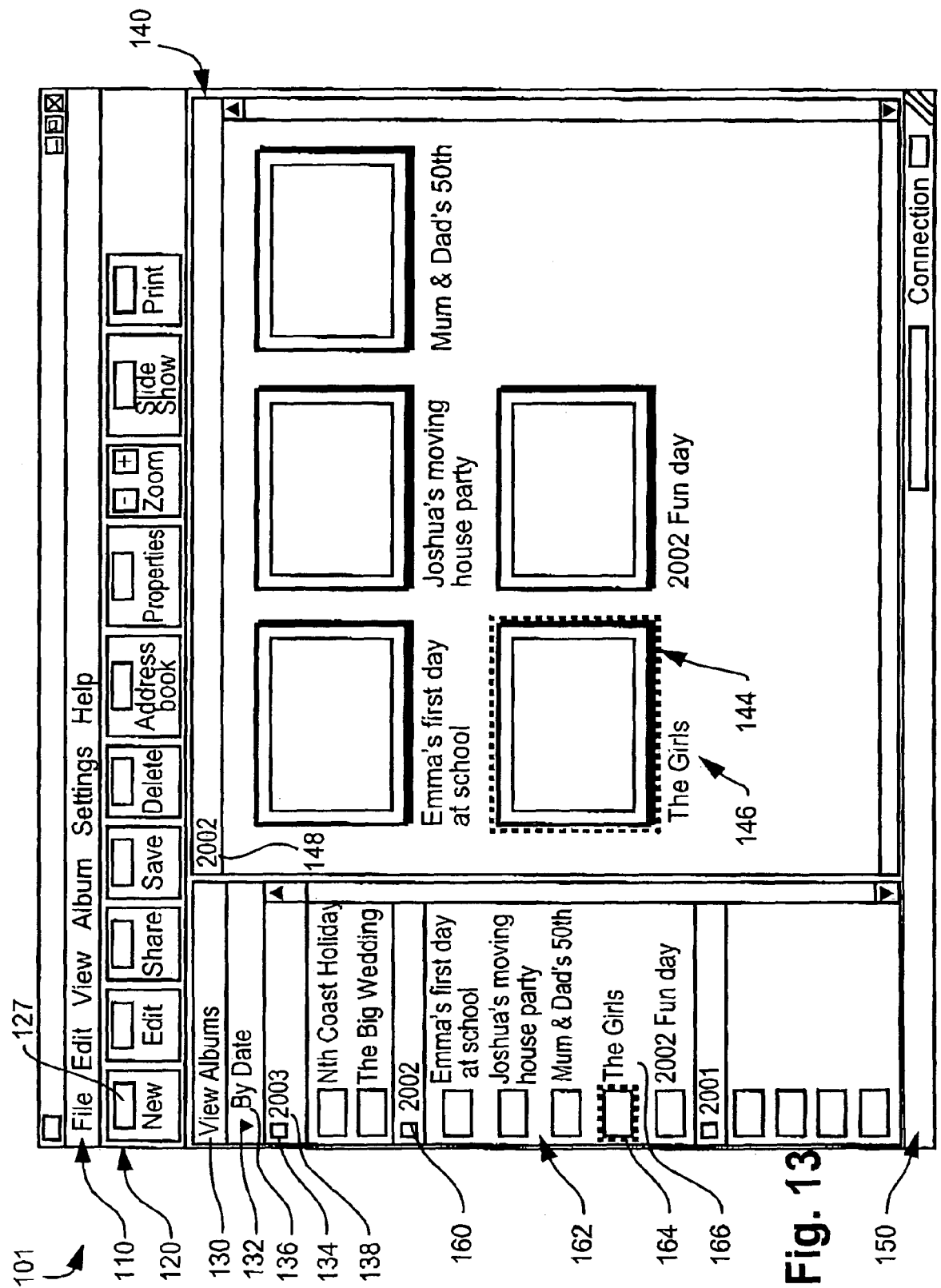
FIG. 13 shows an album creator GUI for viewing the available image repositories.

FIG. 13 shows an album creator GUT 101 for viewing the available image repositories. The GUI 101 comprises a menu selection area 110, a toolbar button area 120, an album browser area 130, an album viewing area 140, and a status display area 150.

The menu selection area 110 consists of a series of headings that, upon selection using a pointing device such as the mouse 2103 in FIG. 3, cause a menu of operations to be presented on the screen 2114 in FIG. 3 from which an operation may be selected.

The toolbar button area 120 consists of a series of buttons that may be selected with the mouse 2103. The buttons are not necessarily available under all conditions, as is commonly found in such applications. A toolbar button, for example the NEW button 127, that is unavailable may be shown with different appearance in order to indicate this unavailable status. As the mouse 2103 is positioned over a toolbar button, the appearance of the button can change to indicate that selection can be performed.

The album browser area 130 is used to display the multimedia albums that are available as image repositories. The album browser area 130 comprises a number of components. At the top is a Sort Mode Selector 132 which provides a means for choosing the order in which the multimedia albums appear within the album browser area 130. It is possible to select various sorting criteria including (i) date/time of creation of the album as is presently shown at 136, (ii) alphabetical sorting by album title, (iii) alphabetical sorting by author name, and (iv) alphabetical sorting by status of the album whether it be a received album, saved album or shared album. The available sorting modes are shown on a drop-down list of options that is presented when the Sort Mode Selector 132 is activated.

The album browser area 130 also contains a number of groupings of albums such as 162, each grouping having a heading such as 138. Within the grouping 162 there are displayed a number of thumbnail images 164 each representing one album. Adjacent to this thumbnail is the title 166 of the album. In one arrangement the thumbnail image 164 is an image of the first page of the album repository, however other alternative images can be used for the thumbnails including a title page for the album, a representative image of the album or a selected page from the album.

The heading 138 of the grouping can be selected by using the mouse 2103 thereby causing the appearance of the heading 138 to be altered to thereby indicate that the selected grouping such as 160 is active. Upon selection with the mouse on the heading 160, the album viewing area 140 is updated to show the title page for each of the albums in the selected grouping 162. The viewing area 140 shows an image 144 for each album in the grouping 162, and a corresponding title 146 of the album. The album image 144 is larger than the corresponding thumbnail 164 shown in the album browser area 130 thus allowing easier selection from within the group 162. At the top of the viewing area 140 a name 148 of the grouping is shown.

Selection of a particular album can be performed by selecting, with the mouse 2103, one of the album images 164 or 144 or one of the corresponding album titles 166 or 146. When this selection is performed, the album selected becomes the active album on the display 140. Highlighting of the display may occur during selection, as shown by sunburst patterns surrounding the album images 164 and 146, and the GUI is changed to an alternative view as shown in FIG. 14.

Figure 14:
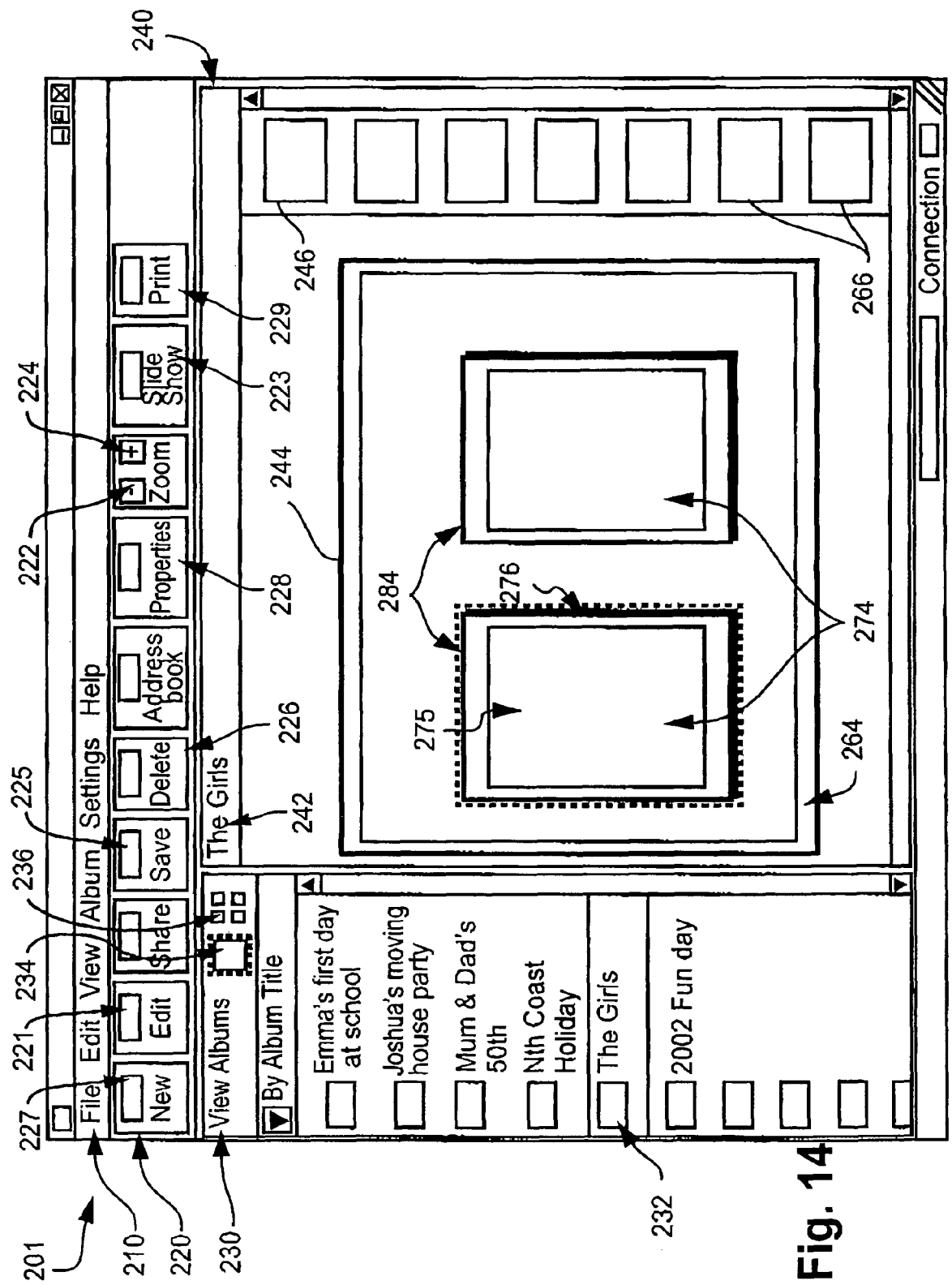
FIG. 14 shows an album creator GUT for viewing a page of an album that has been selected using the GUI of FIG. 13.

FIG. 14 shows an album creator GUI 201 for viewing a page of an album that has been selected using the GUI of FIG. 13. Aspects of the screen layout are similar to FIG. 13, for example the menu selection area 210 and toolbar button area 220 are similar to the corresponding menu selection area 110 and toolbar button area 120. An album browser area 230 is also shown, this behaving in a similar fashion to the corresponding browser area 130 in FIG. 13. An album viewing area 240, operating in a similar fashion to the album viewing area 140 in FIG. 13, displays the content of the single album that has been selected in the browser 230, the displayed album having a highlighted image and title 232.

The album viewing area 240 comprises a title bar 242, an album page display 244 and a page navigator area 246. The album page display 244 shows a representation of a page of the selected album, and consists of a background image 264, a plurality of images 274 and decorative borders for the images 284. A caption for each image (not shown) may appear below the images 274. The page navigator area 246 comprises a plurality of images 266 each representing a page in the selected album. An image 266 may be selected with the mouse 2103 to thereby cause the main display 244 to change to a different page.

The "Zoom−button" 222 can be selected to thereby cause the main display 244 to reduce in size. The "Zoom+button" 224 can be selected to cause the main display 244 to increase in size. The resolution of the image chosen for the display can be made to vary depending on the zoom factor. For example, when the image is very small on the display it is most appropriate to use a low-resolution image. Where the display is zoomed in it is more appropriate to use a high-resolution image. This ensures the best balance between display speed and displayed resolution. The album image 275 can be selected with the mouse 2103 and consequently a highlight 276 (depicted by a sunburst pattern) is shown on the screen 244 to indicate that selection has taken place.

In the state where an image 275 is selected, the properties button 228 can be selected to thereby cause a popup display to appear over the album display 240 showing the properties of the selected image 275. Also in the state in which the image 275 has been selected, the print button 229 can be selected to thereby cause the selected image 275 to be printed on the printer 2115 in FIG. 3. Also in the state in which the image 275 has been selected, a save button 225 can be selected to thereby cause the selected image 275 to be saved into a file on the disc 2110 with the directory path and file name being selected by the user. Similarly, if the edit button 221 is selected, an image editor (not shown) can be activated, thereby allowing the image to be changed, for example by applying operations such as cropping, colour correction, red-eye reduction, brightness alteration, contrast alteration and other editing operations.

A resolution indicator (not shown) also appears over each image and indicates whether the high-resolution image is available. When the high-resolution image is not present a button (not shown) may be selected allowing the high-resolution image to be downloaded. This is done, in the described examples, by means of sending a request to the server using the same UUID as the low or medium resolution image and requesting that the high-resolution image be supplied.

As previously noted, different addressing schemes can be used to designate the high, medium and low resolution images. The server may redirect the request to another machine and if no other machine is available it may indicate that the image can only be delivered later. The user can then be given a choice as to whether they wish to request the image for later delivery via the central server. In the preferred arrangement, the resolution indicator and the button are combined, the resultant button having the purpose of saving the image if the high resolution image is available or has been downloaded.

If the SLIDE SHOW button 223 is selected, the album that is currently selected 232 is displayed in a way that in the preferred arrangement occupies the full screen area and has a presentation that allows for advancement to another image or album page after a selectable time. The changeover may be accompanied by transition effects between the two appearances that can indicate cross fades, wipes, dissolves, cuts, intermediate fades to white or black, etc.

Within the album browser area 230, there are two buttons 234 and 236 for choosing the mode of display of the album viewing area 240. The button 234 is shown, by a surrounding "sunburst pattern" as being in the selected state, to thereby indicate that the button 234 depicts the currently active mode of the display 240. This active state means that the display is in "album mode" in which the images 274 in the album are shown in their respective positions on the album page 244. An alternative display mode can be realised when the user selects the mode button 236 with the mouse 2103, to thereby activate a display mode referred to as "image mode", as can be seen in FIG. 15.

Figure 15:
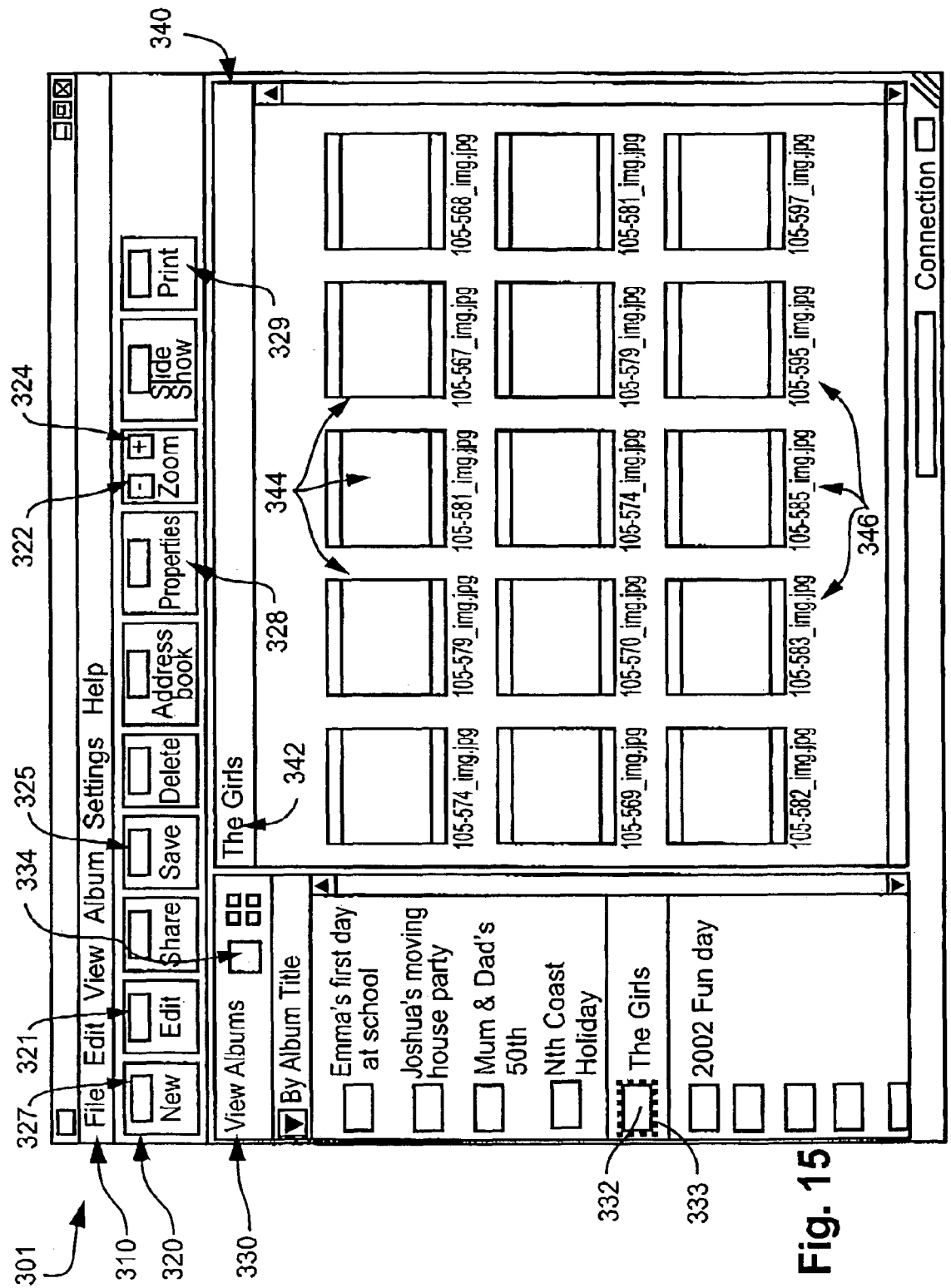
FIG. 15 shows an album creator GUI for viewing images from the album of FIG. 14.

FIG. 15 shows an album creator GUI 301 for viewing images from the selected album of FIG. 14 in which the album has been selected and the images of the album are now displayed. Aspects of the screen layout are similar to FIG. 14, for example the menu selection area 310 and toolbar button area 320 function in a manner similar to the respective areas 210 and 220 in FIG. 14.

FIG. 15 has an album browser area 330 that behaves similarly to the album browser area 220 in FIG. 14, and an album viewing area 340 that displays the title 342 of the album that has been selected in the browser 330, and having a highlighted image and title 332 that is highlighted 333 within the browser 330. The album viewing area 340 displays the content of the single selected album, and shows the title 342 of the selected album plus an array of individual images 344 from the selected album arranged in a grid pattern. Each position in the grid has a square shape in the illustrated example, and is populated with an image from the selected album. The orientation of any displayed image 344, whether it be positioned in landscape mode or portrait mode in the selected album, fills the corresponding grid cell thereby scaling the image to suit the size of the grid cell. The largest dimension of the image, either horizontal or vertical, is scaled to exactly fit the length of the side of the square grid cell. Below each grid cell is displayed a file name 346 of the particular image, truncated if necessary to suit the screen space that is available.

An image 346 can be selected by use of the mouse 2103 in which case operations may be performed as described for FIG. 14 such as zoom 322 and 324, image properties 328, print 329, save 325 and edit 321. If the display mode button 334 is selected with the mouse 2103, then the GUI display returns to that shown in FIG. 14.

Figure 16:
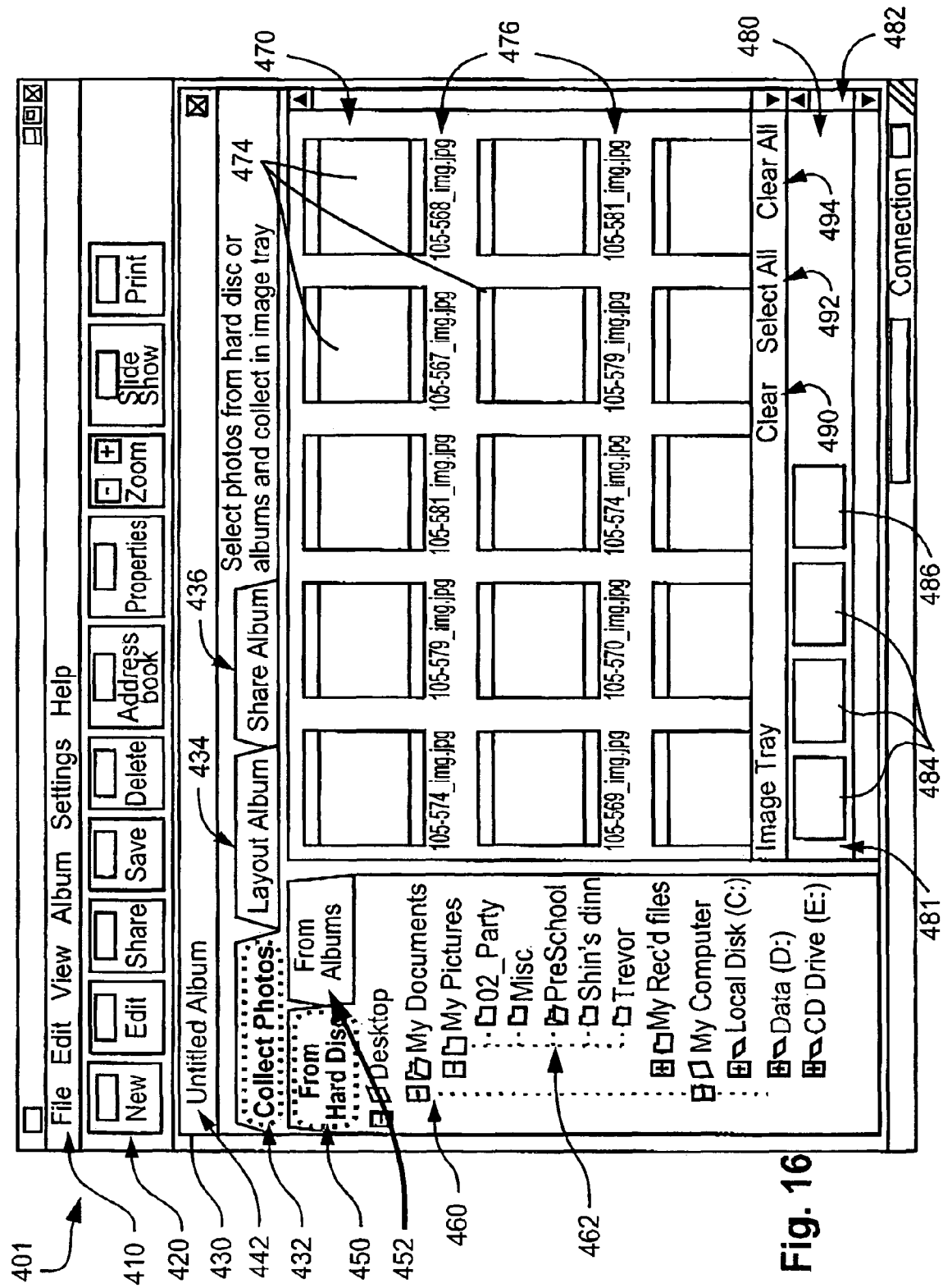
FIG. 16 shows an album creator GUI for collecting images from a hard disk image repository to be used in creating a new album.

FIG. 16 shows an album creator GUI 401 for collecting images from a bard disc image repository to be used in creating a new album as depicted by the assemble images step 1403 in FIG. 4. This mode is entered by selection of the NEW button either at 127, 227 or 327 in FIG. 3, 14, or 15 respectively, which brings up the new GUI screen layout 401. This layout 401 includes a menu selection area 410 and toolbar button area 420 that function similarly to the corresponding areas 310 and 320 respectively in FIG. 15. There is also an area 430 where creation of the album is performed. Within this area 430 there is a title area 442, and an area with tabs showing each of the main operations performed in this view 430 namely COLLECT PHOTOS 432, LAYOUT ALBUM 434 and SHARE ALBUM 436.

In FIG. 16, the COLLECT PHOTOS tab 432 is shown as being the selected mode of operation by a surrounding "sunburst" pattern. This mode allows images that are to be incorporated into an album to be selected from either the file system, when a FROM HARD DISC tab 450 is selected, or from other albums, when a FROM ALBUMS tab 452 is selected. The aforementioned selection process when FROM HARD DISC is selected involves choosing a directory using a directory tree 460. In the illustrated case, a directory "Pre-School" has been selected, this being shown by the fact that the directory is "open" on the display 462. When this selection is performed, the display area 470 shows a grid of images representing those images that are present in the selected directory 462. The display grid is similar to the one shown in FIG. 15, where each cell is square and contains an image 474 from the selected directory, and a corresponding filename 476 of the image.

When presented with the display as shown in FIG. 16, the user can choose an image 474 and add it to the image tray 480 thereby creating an image assembly in the tray 480. This may be performed by selecting the image 474 with a mouse click, and then dragging and dropping the image in the image tray area 480. When the image is dropped into the image tray area 480, according to one arrangement, the image is added after the end of the list 486 that may already be present. Alternately, the image to be added to the tray can be added at an arbitrary position among the images already in the tray by insertion of the image at the dropping point in the list causing all the following images on the tray to be shifted along by one position.

According to the illustrated arrangement, the image tray 480 consists of a rectangular grid of images 484, although usually there is only one row of the grid visible at any time. When the displayed row of images in the tray is full, a scroll bar 482 may be manipulated to bring into view other rows of the tray. Alternately, multiple rows of the rectangular tray grid may be displayed by increasing the size of the tray window, by dragging the GUI element containing the buttons 490, 492 and 494 upwards. In a preferred arrangement, the tray 480 is a one-dimensional linear grid array broken into multiple rows, rather than a two dimensional grid array. This enables the album creator to visualise the arrangement of the album as a linear sequence of images, thus providing an intuitive framework for creating the album that is not provided in as ready a manner by a two dimensional grid array arrangement.

The image tray 480 is a holding area for assembled images 484 before the images are placed into a newly created album. Adding an image to the image tray 480 does not remove the image from the image repository in the file system, or from the display area 470. Operations may be performed to amend the assembly of images as depicted by step 1405 in FIG. 14. The images 484 in the image tray 480 may be re-ordered by using drag and drop within the image tray area. For example, the image 486 can be positioned as the first image in the tray 480 by dragging the image 486 to the left and releasing the mouse pointer in the region 481 before the first image in the tray. When this is done, the display 480 is re-drawn with the new ordering of images.

The images 484 in the image tray 480 can all be removed by selecting the CLEAR ALL button 494. A single image 486 in the tray can be selected with the mouse 2103 and then removed by pressing the CLEAR button 490. Every image 474 in the image display area 470 can be selected simultaneously by clicking the SELECT ALL button 492. This function is useful when all images within a directory 462 are to be added to the image tray 480 by means of drag and drop actions. An image 484 may also appear multiple times within the image tray 480.

Figure 17:
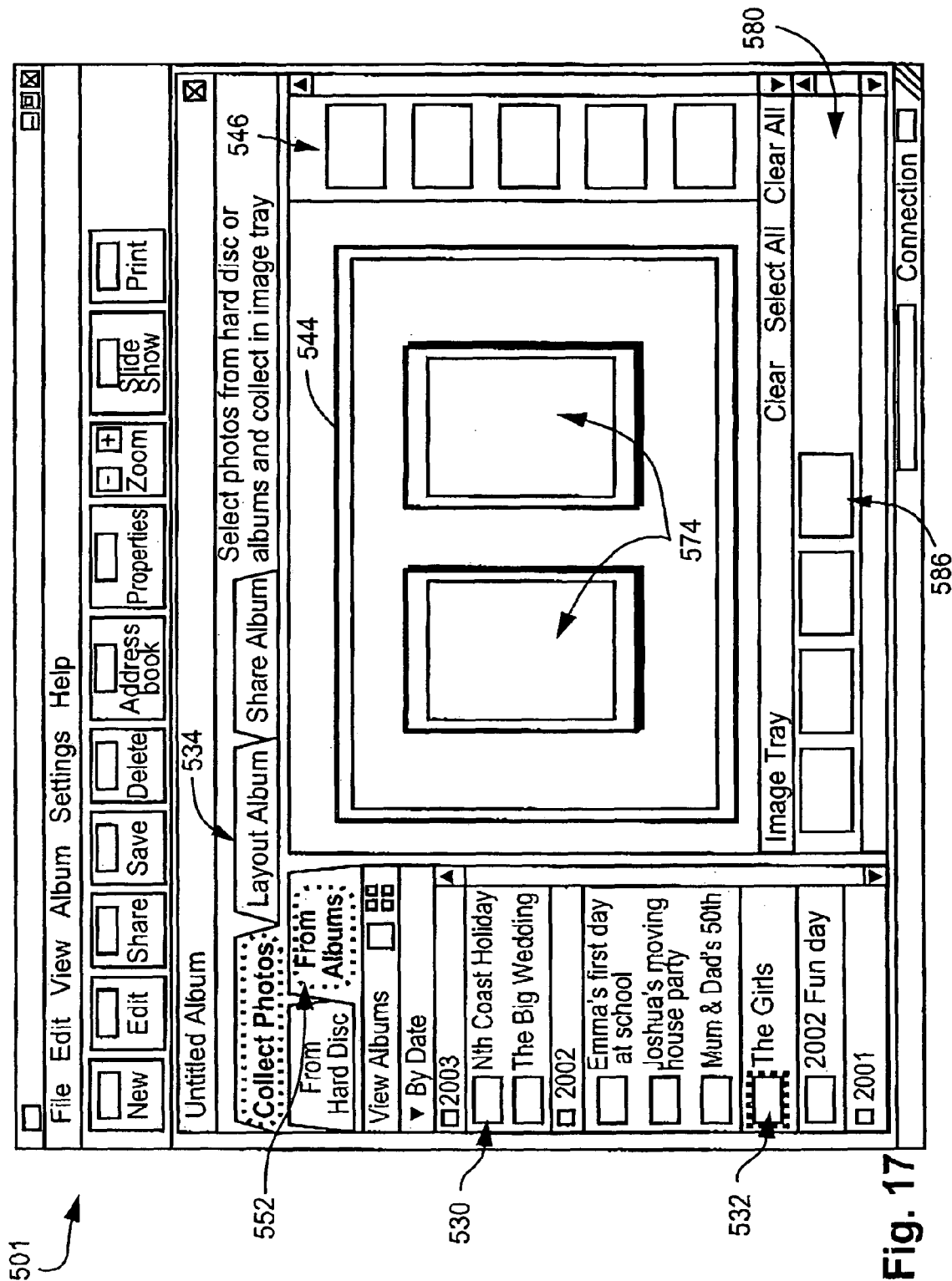
FIG. 17 shows an album creator GUI for collecting images from an album image repository to be used in creating a new album.

FIG. 17 shows an album creator GUI 501 for collecting images from an album image repository to be used in creating the new album as depicted by the assemble images step 1403 in FIG. 4. In the screen shown, the FROM ALBUMS 552 mode is active, as shown by a sunburst pattern, after selection of the FROM ALBUMS button 452 in FIG. 16. In this mode, the image tray, now designated as 580, can be populated by adding images such as 574 from an existing album such as the selected album 532.

The lower part of the screen for the album display is substantially similar to the screen shown in FIG. 14 having an album page display 544, and a page navigator area 546. Images such as 574 can be added to the image tray 580 by means of a drag and drop process using the mouse 2103. Accordingly, if one of the album images 574 is selected with the mouse 2103 and dragged into the image tray area 580 after which the mouse button is released, the image tray 580 shows an additional image 586. It is possible to select a new album within the album browser area 530 and display the selected new album in the album viewer 544, thereby allowing images 574 from different albums to be added to the image tray 580. Image tray 580 operations are provided in a similar manner as for image tray 480, for example, re-ordering, selection and clear, as per step 1405, FIG. 4.

Figure 18A:
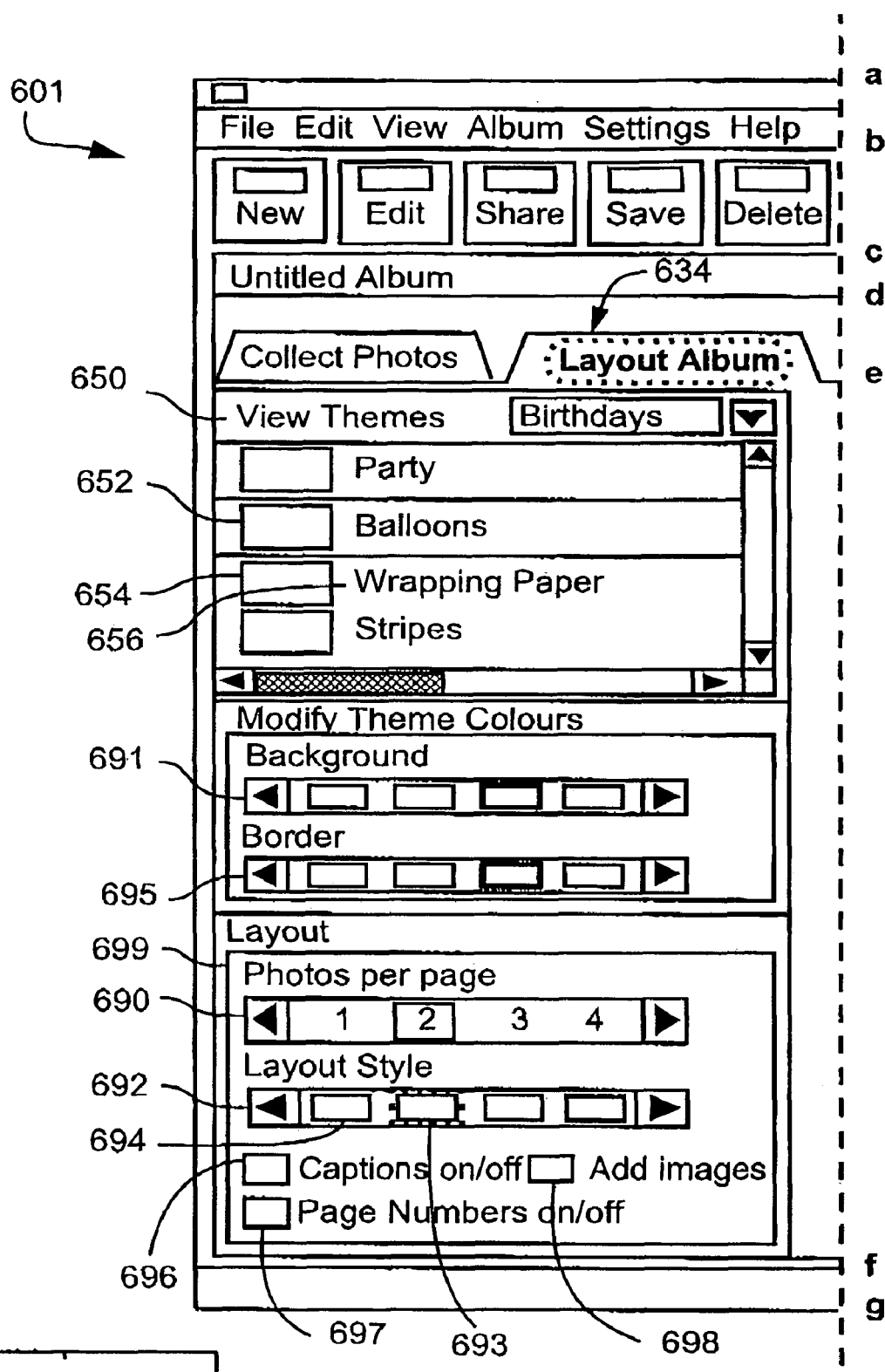
FIG. 18 shows an album creator GUI for laying out images in the new album.
Figure 18B:
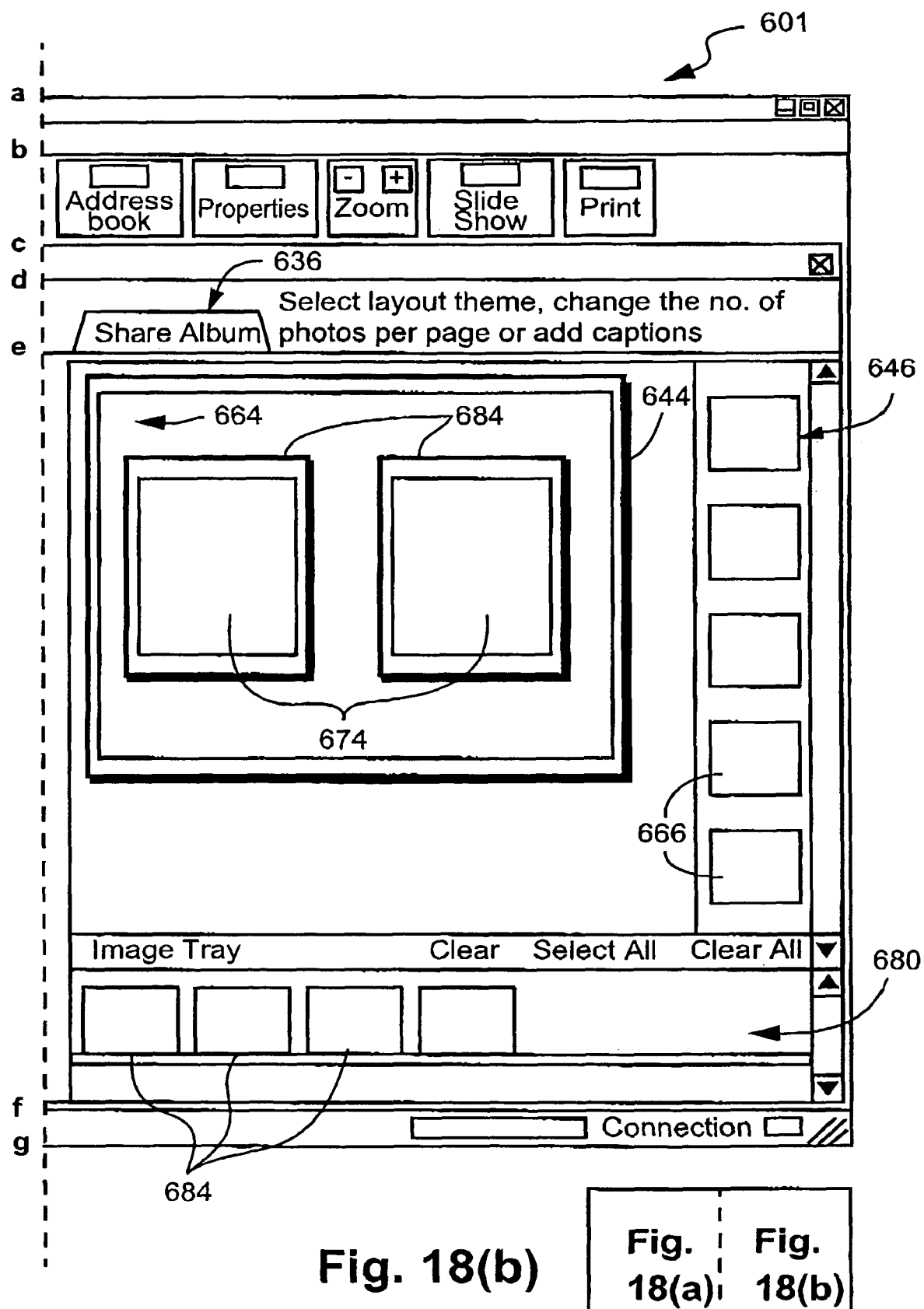

FIG. 18 shows an album creator GUI 601 for laying out images in the new album as depicted by the compile album step 1407 in FIG. 4. The screen 601 shown is displayed in response to the user selecting the LAYOUT ALBUM button 534 or 434 shown in FIG. 17 or FIG. 16, respectively. The consequence of this action is indicated to the user by means of illumination of the layout album tab 634 which is depicted in FIG. 18 by the sunburst pattern surrounding the LAYOUT ALBUM legend.

This GUI 601 provides the means to lay out the images in a page of the album. The first step is to choose the desired images in the image tray 680 (which is equivalent to the corresponding trays such as 580 in FIG. 17) and then to add them to the album page 644. A plurality of image tray images 684 can be added to the album page 644 by dragging a desired image 684 from the image tray 680 with the mouse 1203, and dropping the desired image 684 on the album page 644. As this is done for each selected image tray image, the selected image 684 is added to the album in the order in which the image appears in the image tray 680 and the image is removed from the tray.

If the album page 644 fills with images 674, additional pages are created and added to the album to accommodate the selected images 684. These pages 666 are shown in the page navigator 646. Alternately, an image 684 at a desired position in the tray 680 can be dragged and dropped into the album page 644 at a desired location on the page 644 causing the image to be inserted at that point in the album and previous images to be shifted along by one position in the album.

A facility is provided for automatic addition of images from the image tray 680 to the album page 644. This can be enabled by selecting an ADD IMAGES AUTOMATICALLY button 698. When this button 698 is enabled, the images 684 in the image tray 680 are added to the album page 644 as soon as the LAYOUT ALBUM tab 634 is activated. There is no need to manually add the images in this case.

The second step of laying out the album is to choose the appearance of the album. This is done by application of a "theme" for the album, or for a page of the album. Themes may be chosen using the THEMES control 650. The presently active theme for the page 644 is shown as "birthdays" at 650, and in particular, "balloons" at 652. Each theme is represented by an image 654 and adjoining textual description 656. The theme may be changed by selecting either a theme image 654 or corresponding theme text 656.

When this is done, the album page display 644 is drawn to show how the album page looks with the chosen theme 652 applied. The chosen theme 652 determines the display of the background of the album page 664. The chosen theme 652 also determines the appearance of the borders 684 around the images 674 in the album page. In the preferred arrangement, the album creator can adjust the colour of the background 664 for the chosen theme 652 by means of the colour selector 691.

In addition, the creator can adjust the colour of the borders 684 for the chosen theme 652 by means of the colour selector 695. Thus, for each theme 652 there are many possible colour combinations from which the album creator can choose. In the preferred arrangement, the range of colours offered in the colour selectors 691 and 695 is chosen by a graphic designer in order to ensure the album appearance is pleasing regardless of the artistic skills of the end user.

The third step of laying out the album is for the album creator to select the layout of the album page. This is done by using user interface controls in a display area 699. The album creator can choose the number of images that are to appear on the page 664 by using a selector 690. In the preferred arrangement, a choice of 1 to 6 or 12 images per page is provided. The actual arrangement of images on the page ie "Layout Style" can also be chosen by means of a selector 692. The selector 692 provides a graphical representation 694 of the options for image layout on the page 664, and indicates the option that is currently active, namely 693, by means of a sunburst pattern.

The album creator can choose whether to have captions (not shown) shown on the album page 644. This is enabled or disabled by selecting a CAPTION button 696. The caption for each image 684 (not shown) appears at a position below or adjacent to the image. The album creator can choose whether to have page numbers (not shown) shown on the album page 644. This is enabled or disabled by selecting a PAGE NUMBERS button 697. The page number for each page 644 (not shown) appears at the bottom corner of the page in the preferred arrangement. After performing the three layout steps described, the layout of the album is complete.

In the preferred arrangement, the album page display 644 is created by rendering an HTML document to the screen 2114 (see FIG. 3). The document is composed of references to each of the images 674 in the album and a number of Cascading Style Sheet (CSS) files The CSS files are used to implement the theme choice 652 including background colour 691 and border colour 695 that the album creator has made and the page layout choice that has been made via the button 693. One CSS file is used for the background 664, one CSS file is used for the border 684, and one CSS file is used for the page layout 693 that have been selected by the user. The background and border CSS files may in turn refer to other files containing images.

In the preferred arrangement, the background CSS file refers to a single image file that is replicated across the whole display area 664. Other arrangements are possible, such as the background colour being set internally within the CSS file or a design being drawn by use of scripting such as by execution of a JavaScript program. In the preferred arrangement, the border CSS file refers to a series of eight images, said images being used to create the appearance 684 around the four corners of the album images 674 and on each of the left, right, top and bottom sides of the album images 674. The left and right side border images are stretched in the vertical direction typically by pixel replication and/or interpolation to suit the height of the album image 674 and then placed beside the album images 674. The top and bottom border images are similarly stretched but in the horizontal direction to suit the width of the album images 674 and placed above and below the album images 674.

In the preferred arrangement, the colour of the caption (not shown) is set within the background CSS file, to provide sufficient contrast with the chosen background appearance 664. In the preferred arrangement, a CSS file defines the layout for the page 644, and determines the positioning of each of the images 674 on the album page display, the position and font style of the caption for each of the images and the position and font style of the page number. The font style in each case provides control of the particular font family, font weight and font size used.

Figure 19:
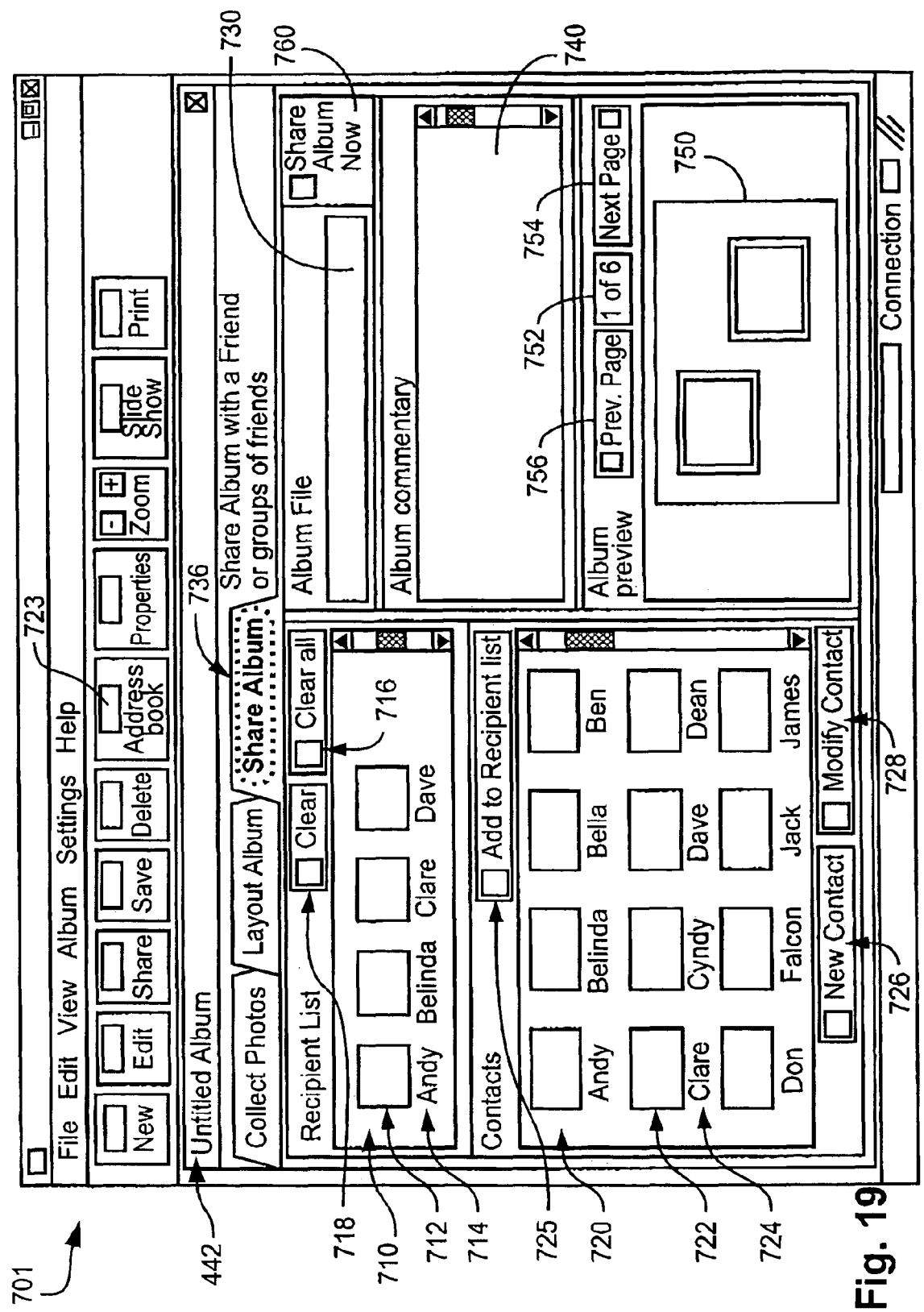
FIG. 19 shows an album creator GUI for sharing the created album.

FIG. 19 shows an album creator GUI 701 for sharing the created album as described in relation to the step 1409 in FIG. 4. The screen shown is displayed in response to the user selecting the SHARE ALBUM button 636 as shown in FIG. 18. The third stage is indicated to the user by means of illumination of the share album tab 736 as depicted by the associated sunburst pattern. This GUI 701 provides the means to complete the album and share the album with selected recipients. The preferred arrangement has display fields for displaying potential recipients 720, selected recipients 710, an album title 730, an album message 740 and an album page preview 750. The button for transmitting the album is the SHARE ALBUM NOW button 760.

Figure 20:
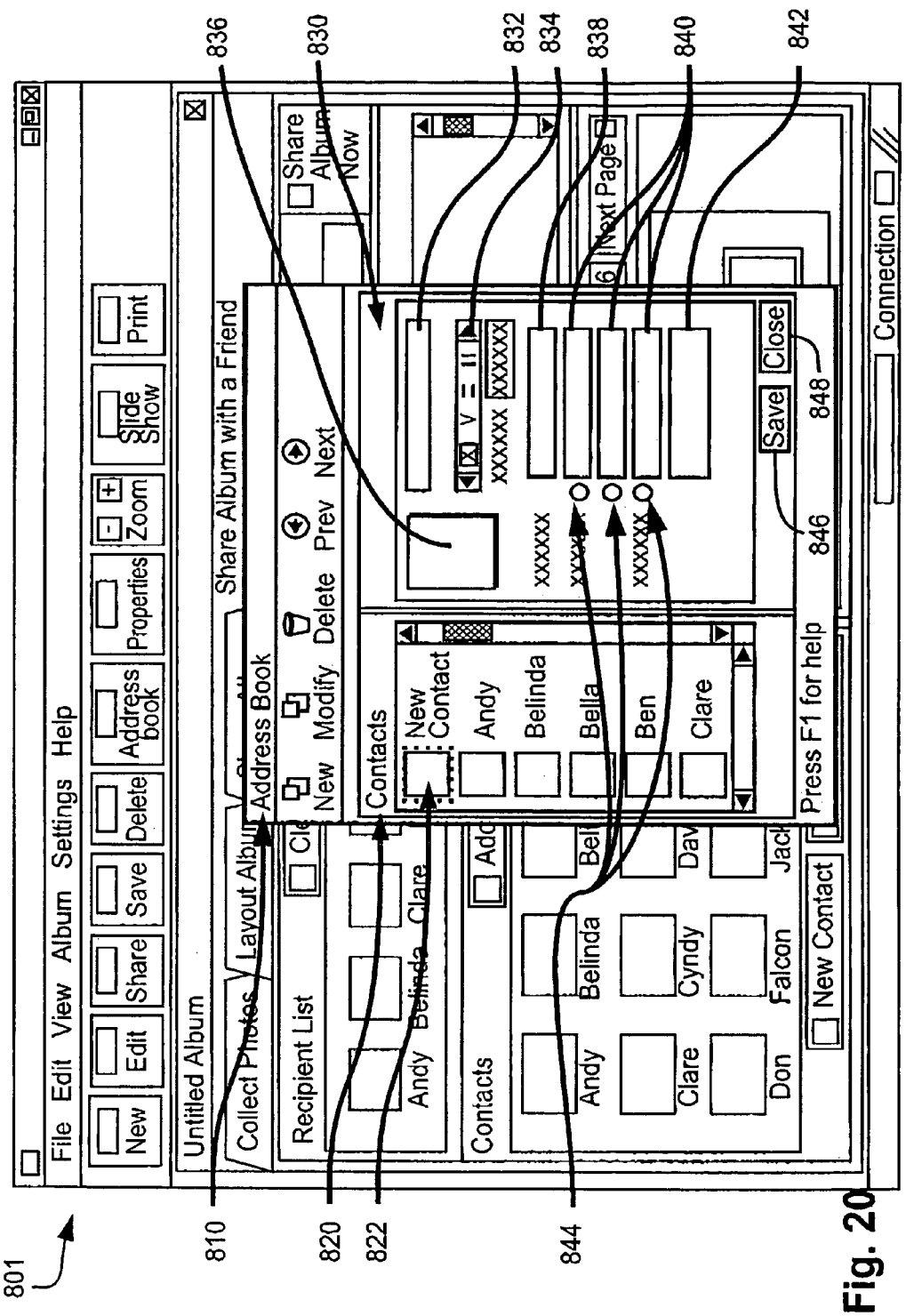
FIG. 20 shows an album creator GUI of an address book used for sharing the created album with one or more recipients.

The Contacts display area 720 shows a grid of images for users that are listed in an address book. Each displayed entry shows a small image 722 and a caption 724 containing the name of the potential recipient. A new entry in the address book can be added by selecting the NEW CONTACT button 726. The effect of this selection is to bring up the Address Book GUI 801 as shown in FIG. 20. An existing entry can be modified by selecting, for example, the image 722 or the associated caption 724, and then pressing a MODIFY CONTACT button 728. When this is done, a display equivalent to 810 in FIG. 20 appears.

The display of all the selected recipients for the album appears as the Recipient List 710. This display comprises images 712 for each of the selected recipients, plus a caption 714 showing their name. A recipient can be added from the potential recipient area 720 to the selected Recipient List 710 by selecting the image 722 or caption 724 and dragging this with the mouse 2103 to the recipient list area 710. When this is done, the image 722 and caption 724 is added in to the recipient list 710 and is displayed as an image 712 and caption 714. A potential recipient appears in the recipient list 710 only once. Entries in the selected recipients list 710 can be presented alphabetically using the name of the user 714 as there is usually no requirement for the user to choose the ordering of the recipients in the list.

As an alternative to the drag and drop method just described, a potential recipient can be added to the selected recipient list 710 by selection of the potential recipient in the list 720 and then by pressing the ADD TO RECIPIENT LIST button 725. The recipient list 710 can be cleared and all entries thus removed by pressing the CLEAR ALL button 716. An entry in the selected recipients list 710 can be removed by selection of the corresponding image 712 or caption 714 and by subsequent pressing of the CLEAR button 718. When an entry is added to the recipients list 710 from the potential recipients list 720, the entry remains displayed in the potential recipients list 720.

The album title 442 can be defined in this GUI 701 by entering the title within an ALBUM TITLE box 730. A message or comment may be added to the album by entering it within an ALBUM COMMENT field 740. This comment field can be displayed by choosing the PROPERTIES button 228 (FIG. 14) when displaying an album. The comment is also visible to a selected recipient in the notification email 910 (FIG. 21) that is sent to the recipient to advise that the album is available for sharing. A preview of the album is shown in an ALBUM PREVIEW area 750. The display 750 shows a page of the album. The page number and number of pages in the album is shown at 752.

The album creator can advance to the next page of the album by pressing a NEXT PAGE button 754 or may go back a page by pressing a PREVIOUS PAGE button 756. When this is done the appropriate page is displayed in the field 750. The album is distributed to those in the recipients list 710 when the SHARE ALBUM NOW button 760 is pressed. The album is saved locally and a notification email is sent to the recipients 710. The screen display then changes back to the GUI 201 shown in FIG. 14 where the album selected 232 is the one that has just been shared.

FIG. 20 shows an album creator GUI 801 of an address book used for sharing the created album with one or more recipients as depicted by the step 1409 in FIG. 4. The GUI 801 is shown after the user has selected the NEW CONTACT button 726 in FIG. 19. The display is characterised by the presence of a pop-up address book 810. The display shows a list of existing contacts (ie potential recipients) 820 and a new contact 822 is shown highlighted in this list by a sunburst pattern. The details of this new contact 822 are shown in a CONTACT DETAILS area 830.

This area 830 comprises a display name 832 for the user, a selector 834 for the screen image, a view of an image 836 for the user, a field 838 for entering the name of the user, email addresses 840 for the user, a field 842 for entering notes on the user, and buttons 844 for selecting the current active email address for the user. Once the contact details 830 for a user (ie a potential recipient) have been entered, a SAVE button 846 is pressed, the details are stored in the address book, and are added to the potential recipient list 820. The pop-up screen 810 for the address book is dismissed by pressing a CLOSE button 848. The display then returns to the previous display. The address book pop-up screen 810 can be activated at any time by pressing an ADDRESS BOOK button such as 723 in the GUI 701.

FIG. 21 shows a recipient GUI 901 providing the recipient with an email notification that the shared album is now available. The GUI 901 appearance is that viewed by a recipient in the recipient list 710 after the SHARE ALBUM NOW BUTTON 760 has been pressed by the sender and the email has been transferred to the recipient. The GUI 901 shows a shared album 906 having a title 902, representative images 903, a "view only" hyperlink 904, and a "manipulate and view" hyperlink 905.

Figure 22:
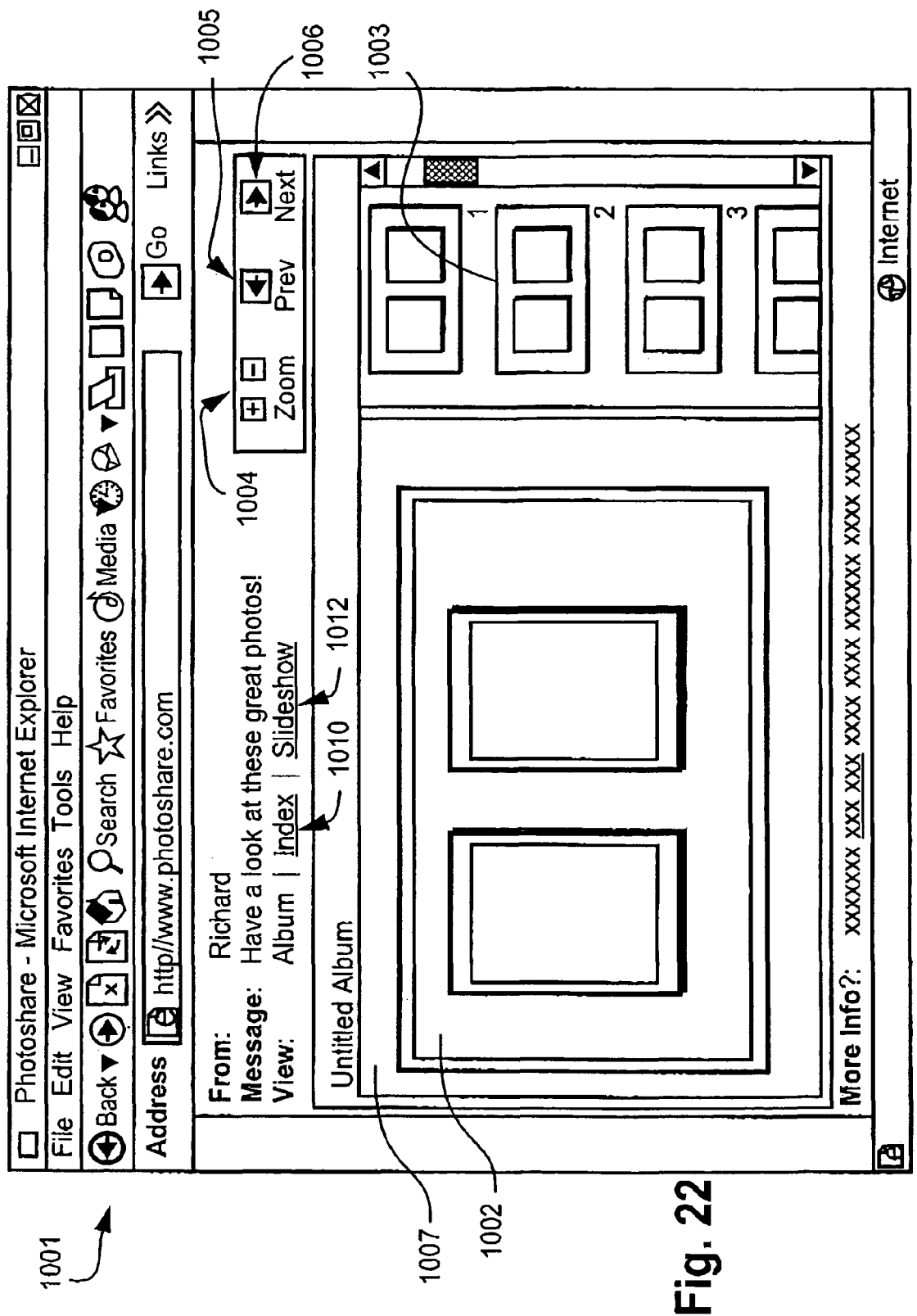
FIG. 22 shows a recipient GUI for viewing the created album.

FIG. 22 shows a recipient GUI 1001 for viewing the created album. The GUI appearance is that of an album viewed by a recipient in the recipient list 710 when they open up and view the album in their web browser application typically after selection of the hyperlink 904. A displayed album page 1002 can be magnified or shrunken using appropriate ZOOM controls 1004. The pages can be viewed in sequence using PREVIOUS and NEXT controls 1005 and 1006 respectively. A desired page 1003 not presently displayed in a viewing area 1007 can be selected by clicking on the desired page 1003 using the mouse 2103.

By selection of the INDEX button 1010 the images in the album may be viewed as a grid of images in a similar manner to the display 340 in FIG. 15. By selection of the SLIDESHOW button 1012 images in the album may be viewed with a pause in between when the image appears and when the following one is displayed. The changeover may be accompanied by transition effects.

INDUSTRIAL APPLICABILITY

It is apparent from the above that the arrangements described are applicable to the image processing industries.

The foregoing describes only some embodiments of the present invention, and modifications and/or changes can be made thereto without departing from the scope and spirit of the invention, the embodiments being illustrative and not restrictive.

| MP05 Figure | State | Mode | Sub Mode | Sub Sub Mode | Description | Screen ID |
|---|---|---|---|---|---|---|
| 2 | B1 | Browse album | Album or nothing selected | Album view mode | Display album page | 2 |
| 3 | B2 | | Album or nothing selected | Image view mode | Display album images | 3 |
| 1 | B3 | | Category entry selected | Thumbnail view | View album thumbnails | 1 |
| 4 | C1 | Collect Photos | From Hard Disk | | Select disk images | 4 |
| 5 | C2 | | From Albums | Album view mode | Select images from album page | 5 |
| n/a | C3 | | From Albums | Image view mode | Select images from album images | n/a |
| n/a | C4 | | From Albums | Thumbnail view | View album thumbnails, no selection | n/a |
| 6 | L1 | Layout Album | | | Lay out the album | 6 |
| 7 | S1 | Share Album | | | Choose recipients, send album | 7 |
| 8 | A1 | Address Book | | | Address book entry | 8 |
| n/a | W1 | Slide Show | | | Sequential display of all album images | |
| n/a | P1 | Properties | | | Show properties of album or image | |
| n/a | R1 | Login/Registration | | | User login with registration facility | |
| n/a | V1 | Save changes | | | Request to save unsaved changes | |
| n/a | D1 | Delete confirmation | | | Confirm delete operation with user | |

-continued

| | | | Toolbar button | | | | | | |
|---|---|---|---|---|---|---|---|---|---|
| MP05 Figure | State | Type | New Album | Edit Album | Share | Save | Delete | Address Book | Properties |
| 2 | B1 | main screen | Y->C1 | Y->L1 | Y->S1 | N | Y->D1 | Y->A1 | Y->P1 |
| 3 | B2 | main screen | Y->C1 | Y->L1 | Y->S1 | N | Y->D1 | Y->A1 | Y->P1 |
| 1 | B3 | main screen | Y->C1 | N | N | N | N | Y->A1 | N |
| 4 | C1 | main screen | N | N | Y->S1 | Y | N | Y->A1 | Y->P1 |
| 5 | C2 | main screen | N | N | Y->S1 | Y | N | Y->A1 | Y->P1 |
| n/a | C3 | main screen | N | N | Y->S1 | Y | N | Y->A1 | Y->P1 |
| n/a | C4 | main screen | N | N | Y->S1 | Y | N | Y->A1 | Y->P1 |
| 6 | L1 | main screen | N | N | Y->S1 | Y | Y->D1 | Y->A1 | Y->P1 |
| 7 | S1 | main screen | N | N | N | Y | N | Y->A1 | Y->P1 |
| 8 | A1 | pop-up dialog | | | | | | | |
| n/a | W1 | pop-up screen | | | | | | | |
| n/a | P1 | pop-up dialog | | | | | | | |
| n/a | R1 | pop-up dialog | | | | | | | |
| n/a | V1 | pop-up dialog | | | | | | | |
| n/a | D1 | pop-up dialog | | | | | | | |

| | | Toolbar button | | | Create mode tabs/buttons | | | | View mode |
|---|---|---|---|---|---|---|---|---|---|
| MP05 Figure | State | Zoom +/- | Slide Show | Print | Collect Photos | Layout Album | Share Album | Close | button Image |
| 2 | B1 | Y | Y->W1 | Y | N | N | N | N | Y->B2 |
| 3 | B2 | Y | Y->W1 | Y | N | N | N | N | N |
| 1 | B3 | Y | N | N | N | N | N | N | N |
| 4 | C1 | Y | N | N | N | Y->L1 | Y->S1 | Y->V1->Bprev | N |
| 5 | C2 | Y | N | N | N | Y->L1 | Y->S1 | Y->V1->Bprev | Y->C3 |
| n/a | C3 | Y | N | N | N | Y->L1 | Y->S1 | Y->V1->Bprev | N |
| n/a | C4 | Y | N | N | N | Y->L1 | Y->S1 | Y->V1->Bprev | N |
| 6 | L1 | Y | N | Y | Y->Cprev | N | Y->S1 | Y->V1->Bprev | |
| 7 | S1 | N | N | N | Y->Cprev | Y->L1 | N | Y->V1->Bprev | |
| 8 | A1 | | | | | | | Y->prev | |
| n/a | W1 | | | | | | | Y->prev | |
| n/a | P1 | | | | | | | Y->prev | |
| n/a | R1 | | | | | | | Y->prev | |
| n/a | V1 | | | | | | | Y->prev | |
| n/a | D1 | | | | | | | Y->prev | |

| | | View mode | Category button | | | | Image tray button | | |
|---|---|---|---|---|---|---|---|---|---|
| MP05 Figure | State | button Album | Drop list | Cat value | Album | Page heading | Add | Clear | Clear All | Select All |
| 2 | B1 | N | Y | | | Album title | | | | |
| 3 | B2 | Y->B1 | Y | Y | Y | Album title | | | | |
| 1 | B3 | N | Y | Y | Y | Category value | | | | |
| 4 | C1 | N | | | | Directory path | Y | Y | Y | |
| 5 | C2 | N | | | | Source album title | Y | Y | Y | |
| n/a | C3 | Y->C2 | | | | Source album title | Y | Y | Y | |
| n/a | C4 | N | | | | Category value | Y | Y | Y | |
| 6 | L1 | | | | | Album title | | Y | Y | Y |
| 7 | S1 | | | | | "Select friends . . . " | | | | |
| 8 | A1 | | | | | | | | | |
| n/a | W1 | | | | | | | | | |
| n/a | P1 | | | | | | | | | |
| n/a | R1 | | | | | | | | | |
| n/a | V1 | | | | | | | | | |
| n/a | D1 | | | | | | | | | |

| MP05 Figure | State | Page Navigator | Other operations |
|---|---|---|---|
| 2 | B1 | Y | |
| 3 | B2 | N | |
| 1 | B3 | N | Select an album thumbnail |
| 4 | C1 | N | Select directory open/close directory tree select image. drag image to tray |
| 5 | C2 | Y | Select image. drag image to tray |
| n/a | C3 | Y | Select image. drag image to tray |
| n/a | C4 | Y | Select an album thumbnail |

-continued

| | | | |
|---|---|---|---|
| 6 | L1 | Y | Select image select in image tray drag image to tray drag from image tray to album. theme selection images/page. layout style. caption options page numbering background/border selection |
| 7 | S1 | N | Select user icon drag user icon to recipients list. recipients buttons add. clear clear all. album comment send now add contact album title |
| 8 | A1 | | |
| n/a | W1 | | |
| n/a | P1 | | |
| n/a | R1 | | |
| n/a | V1 | | |
| n/a | D1 | | |

The claims defining the invention are as follows:

1. A method of accessing, over a network, an image album comprising a plurality of source images, wherein a representation of the image album is stored on a first server, the method comprising the steps of:
   downloading to a receiver, from the first server, the representation of the image album;
   downloading to the receiver, from the first server, reduced resolution images of the plurality of source images dependent upon the representation of the album; and
   at the receiver, designating one of the reduced resolution images and, if the receiver requests a high resolution image, then:
   sending, from the receiver to the first server, a request for a source image corresponding to one of the reduced resolution images, the first server selecting a second server from a plurality of servers storing a copy of the source image and redirecting the request to the second server;
   receiving, at the receiver, from the first server, a notification that the second server and the plurality of servers are off-line;
   the receiver sending to the first server, based on said notification, a request for delayed delivery of the source image, the first server selecting a providing server from among the second server and said plurality of servers once the providing server is on-line; and
   the receiver receiving, over the network from a storage device associated with the selected providing server that is located remotely from the first server, the source image corresponding to the reduced resolution version, in response to the request for delayed delivery of the source image.

2. A method according to claim 1, wherein the representation of the image album comprises at least:
   a theme or a reference thereto for the image album;
   a page layout or a reference thereto for the image album;
   resolution information or a reference thereto for the source images; and
   identifiers or references thereto for the source images.

3. A method according to claim 2, wherein the representation of the image album is an album file and further comprises the reduced resolution images of the source image.

4. A method according to claim 1, wherein the reduced resolution images are stored on the first server.

5. A method according to claim 2, wherein the reduced resolution images are stored on the storage device associated with the second server.

6. A method according to claim 2, comprising the further steps of, prior to the downloading steps:
   assembling, in a visually displayed scratch pad, the source images from at least one image repository;
   compiling the assembled source images from the scratch pad to form the image album; and
   forming the representation of the image album.

7. A method according to claim 2, comprising the further steps of, prior to the downloading steps:
   forming the representation of the image album;
   uploading the representation of the image album to the first server; and
   sending, to the receiver, a link to the representation of the image album, the receiver thereby being able to access the representation of the image album on the first server.

8. A method according to claim 7, wherein:
   the link supports mere viewing of the representation of the image album; and
   the access is provided by sending the representation of the image album from the first server to the receiver in web page format enabling the receiver to view the album using web browser software.

9. A method according to claim 8, wherein the web page format utilizes one or more of HTML, CSS, JPG, GIF and Javascript.

10. A method according to claim 7, wherein:
    the link supports viewing and manipulation of the representation of the image album; and
    the access is provided by sending the representation of the image album from the first server to the receiver in a format enabling the receiver to view and manipulate the received representation of the image album using album creation and sharing software.

11. A method according to claim 10, wherein the format utilizes one or more of XML and JPG.

12. A receiving apparatus for communicating source images from an image album, over a network, wherein a representation of the image album is stored on a first server, the apparatus comprising:
    means for downloading, from the first server, the representation of the image album;
    means for downloading, from the first server, reduced resolution images of the source images dependent upon the representation of the image album;
    means for designating one of the reduced resolution images;
    means for requesting a high resolution image associated with the designated reduced resolution image;
    means for sending to the first server a request for a source image corresponding to the designated reduced resolution image, the first server selecting a second server from a plurality of servers storing a copy of the source image and redirecting the request to the second server;

means for receiving, from the first server, a notification that the second server and the plurality of servers are off-line;

means for sending to the first server, based on said notification, a request for delayed delivery of the source image, the first server selecting a providing server from among the second server and said plurality of servers once the providing server is on-line; and means for receiving over the network, from a storage device associated with the selected providing server that is located remotely from the first server, the source image corresponding to the reduced resolution version.

13. A non-transitory computer-readable storage medium having a computer program recorded therein, in executable form, for causing a computer to communicate source images of an image album, over a network, wherein a representation of the image album is stored on a first server, the program causing the computer to perform the steps of:

downloading to the computer, from the first server, the representation of the image album;

downloading to the computer, from the first server, reduced resolution images of the source images dependent upon the representation of the image album;

at the computer, designating one of the reduced resolution images;

if a high resolution image is requested, then:

sending, from the computer to the first server, a request for a source image corresponding to the designated reduced resolution image, the first server selecting a second server from a plurality of servers storing a copy of the source image and redirecting the request to the second server;

receiving, at the computer, from the first server, a notification that the second server and the plurality of servers are off-line;

the computer sending to the first server, based on said notification, a request for delayed delivery of the source image, the first server selecting a providing server from among the second server and said plurality of servers once the providing server is on-line; and the computer receiving over the network, from a storage device associated with the selected providing server that is located remotely from the first server, the source image corresponding to the reduced resolution version, in response to the request for delayed delivery of the source image.

\* \* \* \* \*